(12) United States Patent
Matsubara et al.

(10) Patent No.: US 7,781,677 B2
(45) Date of Patent: Aug. 24, 2010

(54) TRANSMISSION CABLE

(75) Inventors: Ryo Matsubara, Osaka (JP); Hirotsugu Fusayasu, Kyoto (JP); Shinichi Tanimoto, Kyoto (JP); Seiji Hamada, Osaka (JP)

(73) Assignee: Panasonic Corporation, Osaka (JP)

( * ) Notice: Subject to any disclaimer, the term of this patent is extended or adjusted under 35 U.S.C. 154(b) by 151 days.

(21) Appl. No.: 12/135,668

(22) Filed: Jun. 9, 2008

(65) Prior Publication Data
US 2008/0304578 A1 Dec. 11, 2008

(30) Foreign Application Priority Data
Jun. 11, 2007 (JP) .............................. 2007-153976

(51) Int. Cl.
*H01B 5/16* (2006.01)
*H04B 3/00* (2006.01)
(52) U.S. Cl. ............................... 174/113 R; 174/113 C
(58) Field of Classification Search ............ 174/113 C, 174/126.4, 113 R; 375/257
See application file for complete search history.

(56) References Cited

U.S. PATENT DOCUMENTS 4,600,268 A * 7/1986 Spicer ........................ 385/103

FOREIGN PATENT DOCUMENTS

| JP | 2001-267701 | 9/2001 |
| JP | 3507687 | 12/2003 |

* cited by examiner

*Primary Examiner*—Chau N Nguyen
(74) *Attorney, Agent, or Firm*—Wenderoth, Lind & Ponack, L.L.P.

(57) ABSTRACT

A transmission cable that has three signal lines, and in which there is little unwanted radiation noise, is provided. In a section that is perpendicular to the longitudinal direction of the differential transmission cable, the distance between any two signal lines of the three signal lines is equal to a predetermined value. The differential transmission cable is twisted in its longitudinal direction. The differential transmission cable further includes a dielectric core line, and the signal lines are formed on the surface of the dielectric core line. In the differential transmission cable, the signal lines are formed in a helix in the longitudinal direction of the dielectric core line.

8 Claims, 28 Drawing Sheets

| B1 | B2 | B3 | Vs1[V] | Vs2[V] | Vs3[V] |
|----|----|----|--------|--------|--------|
| 0 | 0 | 0 | 0 | 0 | 0 |
| 0 | 0 | 1 | -1 | 0 | 1 |
| 0 | 1 | 0 | 0 | 1 | -1 |
| 0 | 1 | 1 | -1 | 1 | 0 |
| 1 | 0 | 0 | 1 | -1 | 0 |
| 1 | 0 | 1 | 0 | -1 | 1 |
| 1 | 1 | 0 | 1 | 0 | -1 |
| 1 | 1 | 1 | 0 | 0 | 0 |

*Fig. 11*

| B1 | B2 | B3 | polarity of V1 | polarity of V2 | polarity of V3 |
|---|---|---|---|---|---|
| 0 | 0 | 1 | − | − | + |
| 0 | 1 | 0 | − | + | − |
| 0 | 1 | 1 | − | + | + |
| 1 | 0 | 0 | + | − | − |
| 1 | 0 | 1 | + | − | + |
| 1 | 1 | 0 | + | + | − |

Fig. 13

| B1 | B2 | B3 | Vs1[V] | Vs2[V] | Vs3[V] | V1[V] | V2[V] | V3[V] | polarity of V1 | polarity of V2 | polarity of V3 |
|---|---|---|---|---|---|---|---|---|---|---|---|
| 0 | 0 | 0 | 0.25 | 0 | -0.25 | 0.25 | 0.25 | -0.5 | + | + | − |
| 0 | 0 | 1 | -1.25 | 0 | 1.25 | -1.25 | -1.25 | 2.5 | − | − | + |
| 0 | 1 | 0 | 0.25 | 1 | -1.25 | -0.75 | 2.25 | -1.5 | − | + | − |
| 0 | 1 | 1 | -1.25 | 1 | 0.25 | -2.25 | 0.75 | 1.5 | − | + | + |
| 1 | 0 | 0 | 1.25 | -1 | -0.25 | 2.25 | -0.75 | -1.5 | + | − | − |
| 1 | 0 | 1 | -0.25 | -1 | 1.25 | 0.75 | -2.25 | 1.5 | + | − | + |
| 1 | 1 | 0 | 1.25 | 0 | -1.25 | 1.25 | 1.25 | -2.5 | + | + | − |
| 1 | 1 | 1 | -0.25 | 0 | 0.25 | -0.25 | -0.25 | 0.5 | − | − | + |

Fig. 18

| B1 | B2 | B3 | Vs1[V] | Vs2[V] | Vs3[V] | V1[V] | V2[V] | V3[V] | polarity of V1 | polarity of V2 | polarity of V3 |
|---|---|---|---|---|---|---|---|---|---|---|---|
| 0 | 0 | 0 | -0.1 | 0 | 0.1 | -0.1 | -0.1 | 0.2 | − | − | + |
| 0 | 0 | 1 | -0.9 | 0 | 0.9 | -0.9 | -0.9 | 1.8 | − | − | + |
| 0 | 1 | 0 | -0.1 | 1 | -0.9 | -1.1 | 1.9 | -0.8 | − | + | − |
| 0 | 1 | 1 | -0.9 | 1 | -0.1 | -1.9 | 1.1 | 0.8 | − | + | + |
| 1 | 0 | 0 | 0.9 | -1 | 0.1 | 1.9 | -1.1 | -0.8 | + | − | − |
| 1 | 0 | 1 | 0.1 | -1 | 0.9 | 1.1 | -1.9 | 0.8 | + | − | + |
| 1 | 1 | 0 | 0.9 | 0 | -0.9 | 0.9 | 0.9 | -1.8 | + | + | − |
| 1 | 1 | 1 | 0.1 | 0 | -0.1 | 0.1 | 0.1 | -0.2 | + | + | − |

*Fig. 22*

TRANSMISSION CABLE

BACKGROUND OF THE INVENTION

1. Field of the Invention

The present invention relates to transmission cables for transmitting a plurality of signals, and in particular, relates to transmission cables for performing multiple differential transmission in which a plurality of data bits is achieved through differential transmission, which is one method of high-speed signal transmission, with a differential transmission line that is provided with a small number of signal lines.

2. Description of the Related Art

Single-end signals that oscillate with a logical amplitude at the power source voltage have conventionally been used for the transmission of high-speed signals, but the use of low voltage differential signaling (LVDS) has been on the rise in light of the increase in the number of drive frequencies and larger bus widths in conjunction with the recent demand for high-speed data transmission, as well as because of its inhibition of unwanted radiation noise and resistance against exogenous noise. With LVDS, generally the differential driver IC is designed such that only a reverse-phase differential mode current flows between the two transmission lines through which the differential signal flows.

FIG. 25 is a circuit diagram of the differential transmission circuit according to a first conventional technology, and FIG. 26 is a perspective view showing the schematic configuration of the differential transmission circuit of FIG. 25. The differential transmission circuit of FIG. 25 is an example of a conventional LVDS interface configuration. As shown in FIG. 26, a differential driver IC911 is provided on a printed circuit board 914*a* and a differential receiver IC913 is provided on another printed circuit board 914*b* that is away from the printed circuit board 914*a*, and the differential driver IC911 and the differential receiver IC913 are connected by a differential transmission cable 912 serving as a differential transmission line that is provided with a positive signal line 912*a* and a negative signal line 912*b* (the other circuit elements on the printed circuit boards 914*a* and 914*b* have been omitted from the drawings). Thus, a bit information signal that is input to the differential driver IC911 is transferred to the differential receiver IC913 via the differential transmission cable 912 and then output.

In FIG. 25, the positive output terminal of the differential driver IC911 (in FIG. 25, represented by point p1) is connected to the positive input terminal of the differential receiver IC913 via the signal line 912*a*, and similarly, the negative output terminal of the differential driver IC911 (in FIG. 25, represented by point p2) is connected to the negative input terminal of the differential receiver IC913 via the signal line 912*b*. To terminate the differential transmission cable 912, the point p3 where it approaches the differential receiver IC913 on the signal line 912*a* and the point p4 where it approaches the differential receiver IC913 on the signal line 912*b* are connected by a 100-Ω terminal resistor R. The differential transmission cable 912 has a 50-Ω odd mode impedance. The positive signal line 912*a* and the negative signal line 912*b* of the differential transmission cable 912 have equal electrical properties and form equivalent transmission routes, and in LVDS these two signal lines 912*a* and 912*b* together effect the transmission of a single bit information signal. Based on the bit information signal that is input from its input terminal, the differential driver IC911 creates a differential signal that causes a potential difference between the positive and negative sides of the differential transmission cable 912. More specifically, the differential driver IC911 drives an approximately 3.5 mA current in order to generate an approximately 350 mV voltage between points p3 and p4 at either end of the 100-Ω terminal resistor R. The differential receiver IC913 detects the approximately 350 mV differential signal that is produced between points p3 and p4 at either end of the terminal resistor R and converts this to a CMOS level (a voltage level about 20 to 40% of the power source voltage; same hereinafter) and outputs the converted bit information signal from the output terminal.

In LVDS, the signal currents Is that flow through the positive signal line 912*a* and the negative signal line 912*b* of the differential transmission cable 912 are the same size and are in opposite directions, and thus unwanted radiation noise and crosstalk noise are kept from occurring due to the fact that the magnetic fields that are produced by these moving currents cancel each other out, and also because the signal level is small. With regard to exogenous noise also, as long as the positive and negative sides of the differential transmission cable 912 are affected relatively similarly, then there is no effect on the logic value of the signal, and thus LVDS has excellent noise resistance as well. However, the flow of a tiny in-phase common mode current to the differential transmission cable 912 occurs in LVDS, as well as due to differential impedance mismatching in the differential transmission line, such as the printed circuit board or the transmission cable, or the end terminal circuit, and skewing between the signal lines 912*a* and 912*b* of the differential transmission cable 912. In the differential transmission cable 912 in FIG. 25, the differential mode current component is matched by the terminal resistor R and terminated, but there is no route for the common mode current component to flow over the circuit, and it returns via stray capacitance on the printed circuit boards 914*a* and 914*b*, for example. Thus, the common mode current component that is generated in the differential transmission cable 912 was the primary source of unwanted radiation noise that radiates from LVDS transmission systems. In order to solve this issue, the two signal lines 912*a* and 912*b* are laid out parallel to and near one another as shown in FIG. 26, preventing differential impedance mismatch (for example, see Japanese Laid-Open Patent Publication No. 2001-267701). With this method, the common mode current that flows to the differential transmission cable 912, which is made from the two signal lines 912*a* and 912*b*, is inhibited, allowing transmission noise and unwanted radiation noise to be inhibited.

However, compared to ordinary single-end transmission, the differential transmission circuit of FIGS. 25 and 26 has the numerous above-described merits with regard to high-speed transmission, but requires the two signal lines 912*a* and 912*b* in order to transmit a single data bit, and this leads to problems such as requiring a large number of signal lines in order to achieve multiple bit transmission, a thicker differential transmission cable 912, and an increase in the wiring region on the printed circuit boards 914*a* and 914*b*. One method that has been conceived for solving this problem is the use of three signal lines, with one of the signal lines serving as a complementary data line, in order to achieve transmission of two data bits with three signal lines, which required four signal lines in conventional differential transmission (for example, see Japanese Patent No. 3507687).

FIG. 27 is a perspective view that schematically shows the configuration of the differential transmission circuit according to a second conventional technology, and FIG. 28 is a horizontal cross section of the differential transmission cable 912A in FIG. 27. A differential driver IC911A and a differential receiver IC913A are connected by a differential transmission cable 912A, which is made of three signal lines 912*a*,

912b, and 912c. A first bit information signal that is input to the differential driver IC911A is transmitted to the differential receiver IC913A over the signal lines 912a and 912b, and similarly, a second bit information signal that is input to the differential driver IC911A is transmitted to the differential receiver IC913A over the signal lines 912b and 912c. A terminal resistor for terminating the signal lines 912a and 912b, and a terminal resistor for terminating the signal lines 912b and 912c, are provided in the differential receiver IC913A. When the three signal lines 912a, 912b, and 912c of the differential transmission cable 912A are disposed as shown in FIG. 28, the distances between the two adjacent signal lines 912a and 912b, and 912b and 912c, and the signal lines 912a and 912c on the sides, are different (L1≠L3, L2≠L3), and this creates a novel problem in that the electromagnetic fields cannot cancel each other out because a constant differential impedance cannot be maintained, and unwanted radiation noise cannot be reduced.

SUMMARY OF THE INVENTION

It is an object of the invention to solve the foregoing issues by providing a transmission cable that is provided with three signal lines and that is for transmitting a plurality of signals, in which there is little unwanted radiation noise.

In a first aspect of the invention, a transmission cable is used in a multiple differential transmission system and performs multiple transmission of a group a three differential signals, and is provided with three signal lines. In a cross section perpendicular to a longitudinal direction of the transmission cable, the distance between any pair of signal lines of the three signal lines is equal to a predetermined value.

Further, the multiple differential transmission system is provided with a signal transmitter and a signal receiver. The signal transmitter is connected to a differential transmission path that has first, second, and third signal lines, and is provided with a first differential driver, a second differential driver, and a third differential driver. The first differential driver transmits a first output signal, and an inverted first output signal that is a phase inverted signal of the first output signal, in response to a first bit information signal. The second differential driver transmits a second output signal, and an inverted second output signal that is a phase inverted signal of the second output signal, in response to a second bit information signal. The third differential driver transmits a third output signal, and an inverted third output signal that is a phase inverted signal of the third output signal, in response to a third bit information signal.

The signal transmitter synthesizes the first output signal and the inverted third output signal and transmits the result to the first signal line, synthesizes the second output signal and the inverted first output signal and transmits the result to the second signal line, and synthesizes the third output signal and the inverted second output signal and transmits the result to the third signal line. The absolute value of the binary signal voltage of the first output signal and the absolute value of the binary signal voltage of the second output signal are identical, and the absolute value of the binary signal voltage of the third output signal and absolute value of the binary signal voltage of the first output signal are different.

Further, the signal receiver is connected to the differential transmission path, which has the first, second, and third signal lines, and is provided with a first differential receiver, a second differential receiver, a third differential receiver, a comparison unit, and a control unit.

The first differential receiver detects a polarity of a terminal voltage that is generated in a first terminal resistor that is connected between the first signal line and the second signal line, and outputs the result of that detection as a first bit information signal. The second differential receiver detects a polarity of a terminal voltage that is generated in a second terminal resistor that is connected between the second signal line and the third signal line, and outputs the result of that detection as a second bit information signal. The third differential receiver detects a polarity of a terminal voltage that is generated in a third terminal resistor that is connected between the third signal line and the first signal line, and outputs the result of that detection as a third bit information signal. The comparison unit is for determining whether or not the absolute value of the third terminal voltage that is generated in the third terminal resistor exceeds a predetermined threshold voltage. The control unit is for outputting the first, second, and third bit information signals that are output from the first, second, and third differential receivers, when the absolute value of the third terminal voltage exceeds the predetermined threshold voltage, and outputs a 0 or 1 for all of the first, second, and third bit information signals, depending on the third bit information signal that is output from the third differential receiver, when the absolute value of the third terminal voltage does not exceed the predetermined threshold voltage.

In the signal receiver, the threshold voltage is set so that it is larger than the absolute value of the difference between the absolute value of the binary signal voltage of the first output signal and the absolute value of the binary signal voltage of the third output signal.

A second aspect of the invention is the first aspect, wherein the three signal lines are twisted about one another in the longitudinal direction of the three signal lines.

A third aspect of the invention is a transmission cable that is furnished with a core line made from a dielectric material, and three signal lines that are formed on a surface of the core line, wherein in a cross section perpendicular to a longitudinal direction of the transmission cable, the distance between any pair of signal lines of the three signal lines is equal to a predetermined value.

A fourth aspect of the invention is the third aspect of the invention, wherein the transmission cable is used in a multiple differential transmission system and performs multiple transmission of a group of three differential signals. The multiple differential transmission system is provided with a signal transmitter and a signal receiver.

The signal transmitter is connected to a differential transmission path that has first, second, and third signal lines, and is provided with a first differential driver, a second differential driver, and a third differential driver. The first differential driver transmits a first output signal, and an inverted first output signal that is a phase inverted signal of the first output signal, in response to a first bit information signal. The second differential driver transmits a second output signal, and an inverted second output signal that is a phase inverted signal of the second output signal, in response to a second bit information signal. The third differential driver transmits a third output signal, and an inverted third output signal that is a phase inverted signal of the third output signal, in response to a third bit information signal.

The signal transmitter synthesizes the first output signal and the inverted third output signal and transmits the result to the first signal line, synthesizes the second output signal and the inverted first output signal and transmits the result to the second signal line, and synthesizes the third output signal and the inverted second output signal and transmits the result to the third signal line. The absolute value of the binary signal voltage of the first output signal and the absolute value of the binary signal voltage of the second output signal are identical, and the absolute value of the binary signal voltage of the third output signal and absolute value of the binary signal voltage of the first output signal are different.

The signal receiver is connected to the differential transmission path, which has the first, second, and third signal lines, and is provided with a first differential receiver, a second differential receiver, a third differential receiver, comparison unit, and a control unit. The first differential receiver detects a polarity of a terminal voltage that is generated in a first terminal resistor that is connected between the first signal line and the second signal line, and outputs the result of that detection as a first bit information signal. The second differential receiver detects a polarity of a terminal voltage that is generated in a second terminal resistor that is connected between the second signal line and the third signal line, and outputs the result of that detection as a second bit information signal. The third differential receiver detects a polarity of a terminal voltage that is generated in a third terminal resistor that is connected between the third signal line and the first signal line, and outputs the result of that detection as a third bit information signal. The comparison unit is for determining whether or not the absolute value of the third terminal voltage that is generated in the third terminal resistor exceeds a predetermined threshold voltage. The control unit is for outputting the first, second, and third bit information signals that are output from the first, second, and third differential receivers, when the absolute value of the third terminal voltage exceeds the predetermined threshold voltage, and outputs a 0 or 1 for all of the first, second, and third bit information signals, depending on the third bit information signal that is output from the third differential receiver, when the absolute value of the third terminal voltage does not exceed the predetermined threshold voltage. Further, the threshold voltage is set so that it is larger than the absolute value of the difference between the absolute value of the binary signal voltage of the first output signal and the absolute value of the binary signal voltage of the third output signal.

A fifth aspect of the invention is the third aspect or the fourth aspect of the invention, wherein the three signal lines are formed as a conductor pattern that is printed on a surface of the core line.

A sixth aspect of the invention is the third aspect or the fourth aspect of the invention, wherein the three signal lines are formed by etching a conductor layer that is formed on a surface of the core line.

A seventh aspect of the invention is any one of the third through sixth aspects of the invention, wherein the three signal lines are formed in a helical shape in the longitudinal direction of the core line.

An eighth aspect of the invention is any one of the first through seventh aspects of the invention, wherein the three signal lines have 120-degree rotational symmetry about the center of the transmission cable, in a cross section perpendicular to the longitudinal direction of the transmission cable.

A ninth aspect of the invention is any one of the first through seventh aspects of the invention, wherein the transmission cable has 120-degree rotational symmetry about the center of the transmission cable, in a cross section perpendicular to the longitudinal direction of the transmission cable.

With the present invention, in a transmission cable with three signal lines it is possible to maintain a constant distance and differential impedance between the signal lines, and thus it is possible to provide a multiple differential transmission cable with little unwanted radiation noise in which the electromagnetic fields between signals that are transmitted cancel each other out.

In particular, this effect becomes pronounced when the multiple differential transmission cable of the invention is used in a multiple differential transmission system.

BRIEF DESCRIPTION OF THE DRAWINGS

FIG. 11 is a diagram that shows the relationship between the bit information that is transferred, and the signal voltages Vs1, Vs2, and Vs3 of the signal lines 2a, 2b, and 2c of the signal transmission route (differential transmission line) 2, in the multiple differential transmission system of FIG. 8.

FIG. 13 is a diagram that shows the relationship between the bit information that is transmitted, and the polarity of the terminal voltages V1, V2, and V3 of the terminal resistors 41, 42, and 43 of the signal receiver 3, in the multiple differential transmission system of FIG. 8.

FIG. 18 is a diagram that shows the relationship between the bit information that is transmitted, the signal voltages Vs1, Vs2, and Vs3 of the transmitted signals that are transmitted over the signal lines 2a, 2b, and 2c, and the terminal voltages V1, V2 and V3, and their polarities, of the terminal resistors 41, 42, and 43 of the signal receiver 3A, in the multiple differential transmission system of FIG. 15.

FIG. 22 is a diagram that shows the relationship between the bit information that is transmitted, the signal voltages Vs1, Vs2, and Vs3 of the transmitted signals that are transmitted over the signal lines 2a, 2b, and 2c, and the terminal voltages V1, V2, and V3, and their polarities, of the terminal resistors 41, 42, and 43 of the signal receiver 3B, in a third multiple differential transmission system that includes the differential transmission line (differential transmission cable) according to the first embodiment of the invention (using the configuration of FIG. 15, differing only in the setting conditions).

DETAILED DESCRIPTION OF THE INVENTION

Embodiments of the invention are described below in reference to the drawings. It should be noted that in the various embodiments, identical structural components have been assigned the same reference numbers.

First Embodiment

<1.1: Differential Transmission Cable>

Figure 1:
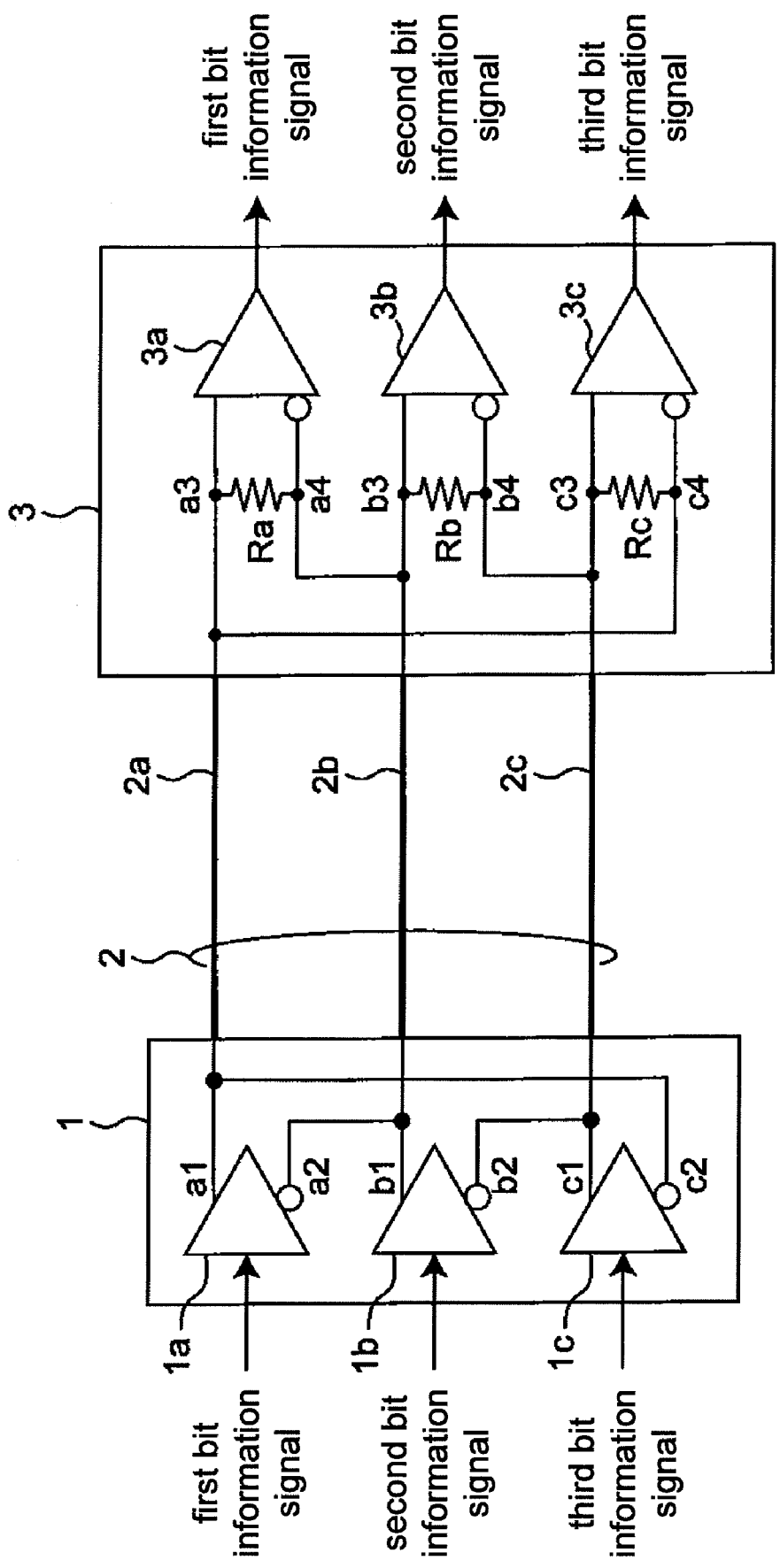
FIG. 1 is a circuit diagram of a differential transmission circuit according to a first embodiment of the invention.
Figure 2:
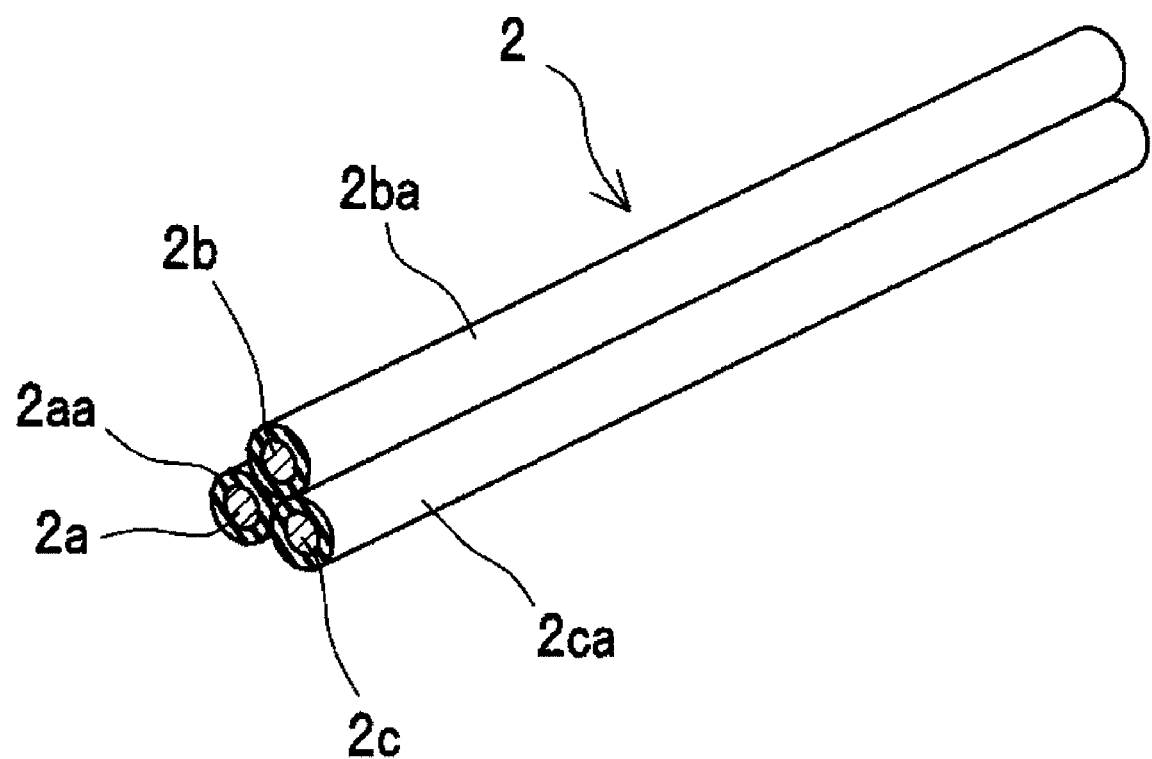
FIG. 2 is a perspective view that shows a partial section of the configuration of the differential transmission cable 2 of FIG. 1.
Figure 3:
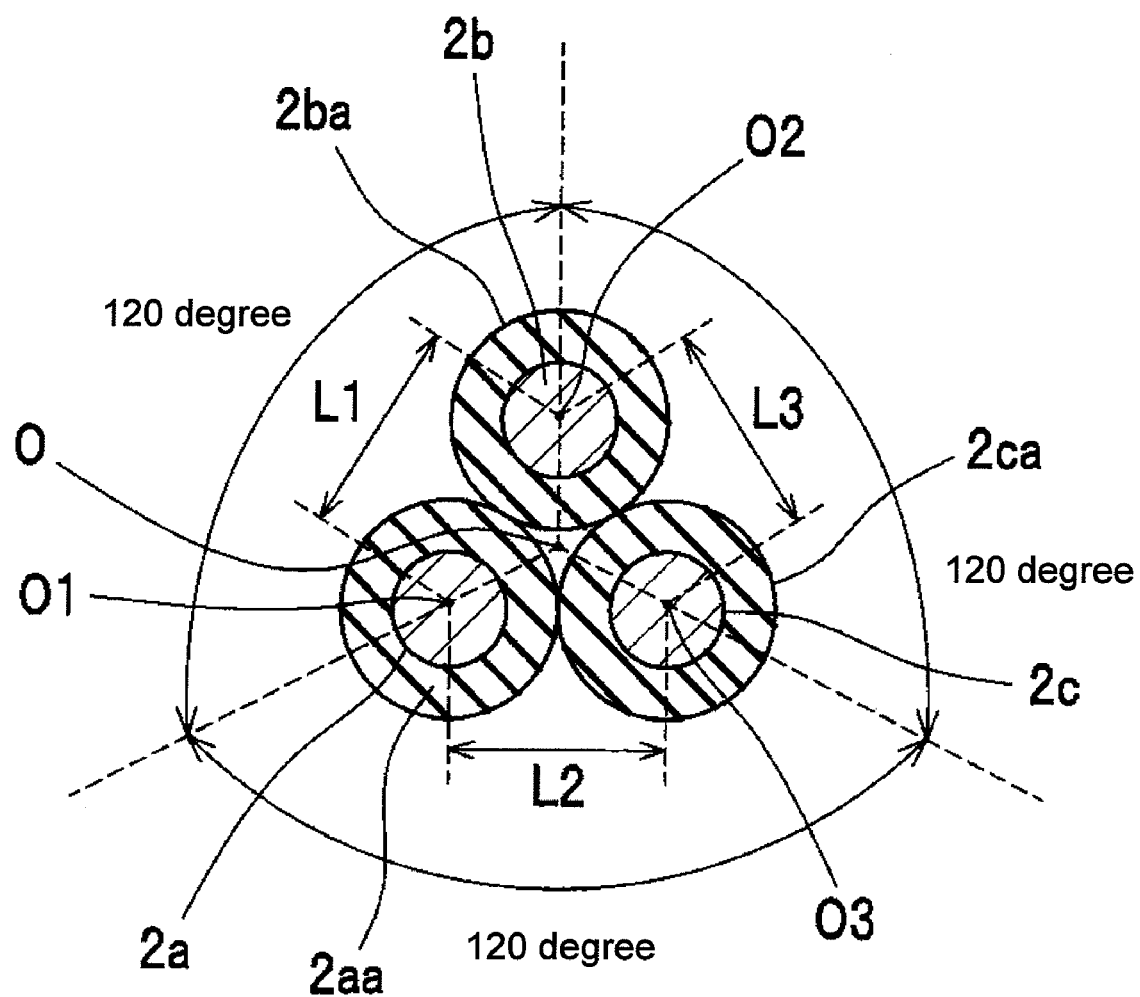
FIG. 3 is a horizontal cross section of the differential transmission cable 2 of FIG. 1.

FIG. 1 is a circuit diagram of a differential transmission circuit according to a first embodiment of the invention, FIG. 2 is a perspective view showing a partial section of the configuration of the differential transmission cable 2 of FIG. 1, and FIG. 3 is a horizontal cross section of the differential transmission cable 2 of FIG. 1. With the differential transmission circuit of this embodiment, three bit information signals are differentially signaled by LVDS via the differential transmission cable 2, which is made from three signal lines 2a, 2b, and 2c.

In FIG. 1, the differential driver IC1 and the differential receiver IC3 are connected by the differential transmission cable 2, which is made from the three signal lines 2a, 2b, and 2c and serves as the differential transmission line, and the three bit information signals that are input to the differential driver IC1 are transmitted to the differential receiver IC3 via the differential transmission cable 2 and then output. The details of the internal structure of the differential driver IC1 and the differential receiver IC3, and the details of signal transmission, are described later. FIGS. 2 and 3 show that the signal lines 2a, 2b, and 2c are formed as conductor lines that are provided with an insulating covering 2aa, 2ba, and 2ca, respectively, such as rubber or vinyl, and which share the same cross-sectional shape. Further, the signal lines 2a, 2b, and 2c are disposed such that, when looking at them in horizontal section, the distance L1 between the centers O1 and O2 of the signal lines 2a and 2b, the distance L2 between the centers O2 and O3 of the signal lines 2b and 2c, and the distance L3 between the centers O3 and O1 of the signal lines 2c and 2a, are equal to one another. Thus, the distance between any pair of signal lines 2a, 2b, and 2c is equal to a predetermined value, and moreover, as shown in FIG. 3, the differential transmission cable 2 made from the signal lines 2a, 2b, and 2c has 120-degree rotational symmetry in its horizontal cross section. Providing the differential transmission cable 2 of this embodiment with this shape has the result that the three signal lines 2a, 2b, and 2c can be easily kept at an even spacing, and thus the differential impedance can be kept constant and the electromagnetic field that is generated by the signal current cancels itself out, and therefore it is possible to achieve a multiple differential transmission cable that has little unwanted radiation noise.

Figure 26:
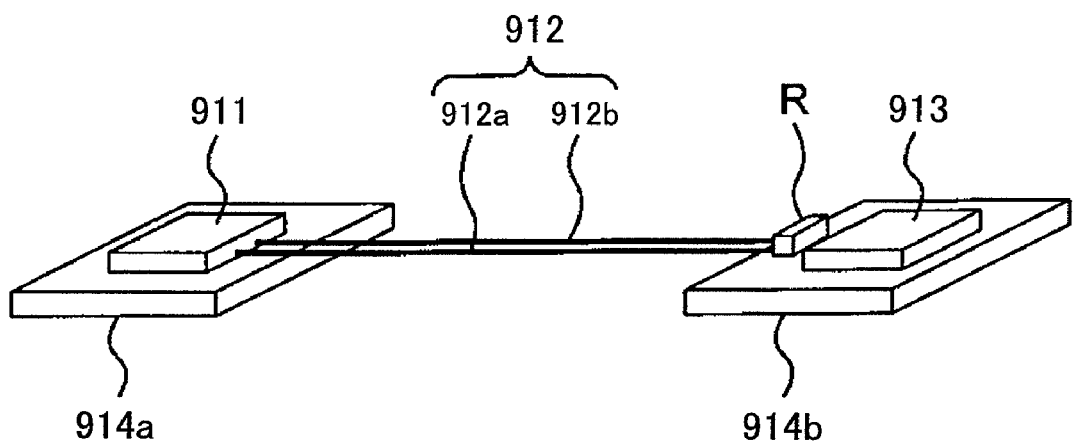
FIG. 26 is a perspective view that schematically shows the configuration of the differential transmission circuit of FIG. 25.
Figure 27:
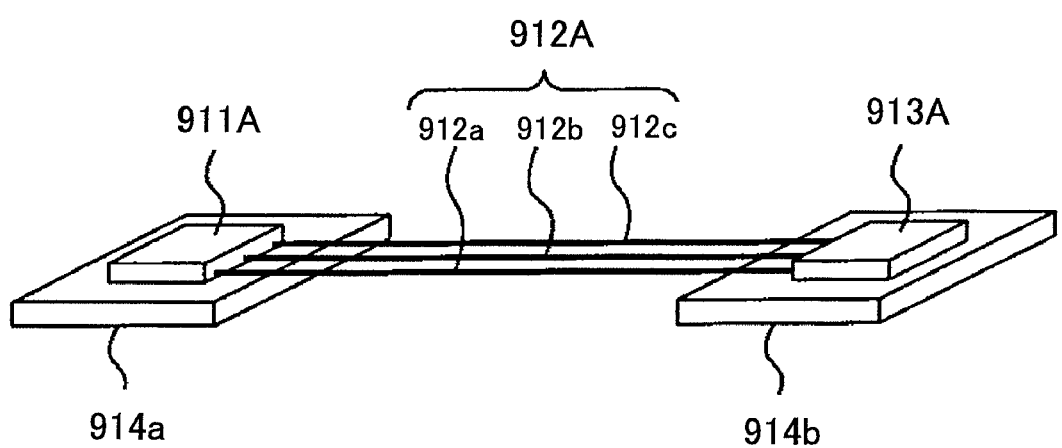
FIG. 27 is a perspective view that schematically shows the configuration of a differential transmission circuit according to a second conventional technology.
Figure 28:
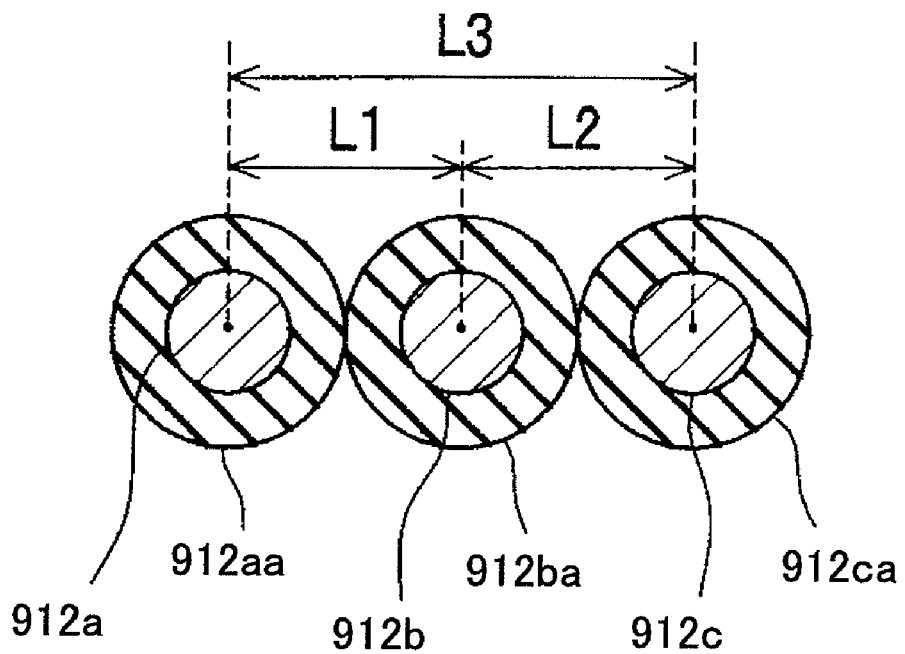
FIG. 28 is a horizontal cross section of the differential transmission cable 912A of FIG. 27.

The method of transmitting three bit information signals using the differential transmission cable 2 is described in detail below. In the differential transmission circuit of FIG. 1, the differential driver IC1 is made of differential driver circuits 1a, 1b, and 1c, and the differential receiver IC3 is made of differential receiver circuits 3a, 3b, 3c, which are differential amplifiers, and terminal resistors R1, Rb, and Rc. The differential driver IC1 and the differential driver IC3 are provided on separate printed circuit boards (not shown), like the differential transmission circuits of FIG. 26 and FIG. 27.

In the differential driver IC1, the positive output terminal a1 of the differential driver circuit 1a is connected to the signal line 2a and its negative output terminal a2 is connected to the signal line 2b, the positive output terminal b1 of the differential driver circuit 1b is connected to the signal line 2b and its negative output terminal b2 is connected to the signal line 2c, and the positive output terminal c1 of the differential driver circuit 1c is connected to the signal line 2c and its negative output terminal c2 is connected to the signal line 2a. The differential driver circuits 1a, 1b, and 1c each drive an approximately 3.5 mA current, and generate a differential signal in response to the bit information signal that arrives at the differential driver IC1. More specifically, the differential driver circuit 1a generates differential signals (that is, a signal with a predetermined amplitude, and its inverse signal) in response to a first bit information signal that arrives at the differential driver IC1 in order to produce a potential difference between the signal lines 2a and 2b. For example, when the bit information signal is 0, then the differential driver circuit 1a outputs a negative potential signal from the positive output terminal a1 and outputs a positive potential signal from the negative output terminal a2, whereas when the bit information signal is 1, the differential driver circuit 1a outputs a positive potential signal from the positive output terminal a1 and outputs a negative potential signal from the negative output terminal a2. Similarly, the differential driver circuit 1b generates differential signals in response to a second bit information signal that arrives at the differential driver IC1 in order to produce a potential difference between the signal lines 2b and 2c, and the differential driver circuit 1c generates differential signals in response to a third bit information signal that arrives at the differential driver IC1 in order to produce a potential difference between the signal lines 2c and 2a. The differential transmission line 2 has an odd mode impedance of 50Ω, for example, between the signal lines 2a, 2b, and 2c. The signal lines 2a, 2b, and 2c have equal electrical properties and form equivalent transmission routes, and these three signal lines 2a, 2b, and 2c together effect the transmission of three bit information signals. The differential receiver IC3 is provided with a terminal resistor Ra that terminates the pair of signal lines 2a and 2b, a terminal resistor Rb that terminates the pair of signal lines 2b and 2c, and a terminal resistor Rc that terminates the pair of signal lines 2c and 2a. The terminal resistors Ra, Rb, and Rc each have a 100Ω resistance value, which is equivalent to the differential impedance, and an approximately +350 mV or an approximately −350 mV voltage is generated at each end of the terminal resistors Ra, Rb, and Rc in accordance with the direction of the approximately 3.5 mA current that is driven by the differential driver circuits 1a, 1b, and 1c. The differential receiver circuit 3a detects the positive or negative potential that occurs between the ends of the resistor Ra, and decodes the first bit information signal that was transmitted and converts the decoded first bit information signal to the CMOS level and outputs it. Similarly, the differential receiver circuit 3b detects the positive or negative potential that occurs between the ends of the resistor Rb, and decodes the second bit information signal that was transmitted and converts the decoded second bit information signal to the CMOS level and outputs it, and the differential receiver circuit 3c detects the positive or negative potential that occurs between the ends of the resistor Rc, and decodes the third bit information signal that was transmitted and converts the decoded third bit information signal to the CMOS level and outputs it.

When a bit information signal is transmitted over the differential transmission line 2, the differential receiver IC3 decodes the bit information signal prior to transmission as shown below.

Table 1 is a bit assignment table that shows the relationship between the bit information signals that are transmitted, and the potential (terminal potential) at the terminals on the side of the differential receiver circuits 3a, 3b, and 3c of the signal lines 2a, 2b, and 2c. The values of the terminal potentials have been normalized in order to simplify the description.

TABLE 1

| first bit information | second bit information | third bit information | terminal potential of signal line 2a | terminal potential of signal line 2b | terminal potential of signal line 2c |
|---|---|---|---|---|---|
| 0 | 0 | 0 | 0 | 0 | 0 |
| 0 | 0 | 1 | −1 | 0 | 1 |
| 0 | 1 | 0 | 0 | 1 | −1 |
| 0 | 1 | 1 | −1 | 1 | 0 |
| 1 | 0 | 0 | 1 | −1 | 0 |
| 1 | 0 | 1 | 0 | −1 | 1 |
| 1 | 1 | 0 | 1 | 0 | −1 |
| 1 | 1 | 1 | 0 | 0 | 0 |

Here, the terminal potentials of the signal lines 2a, 2b, and 2c are described. In one signal line, on its driver side, two voltage signals V1 and V2 that are generated by two differential driver circuits are superimposed and applied, and on its receiver side, the overall impedance Z of the receiver is charged. When r is the internal resistance of the signal line, the terminal potential V of the signal line is expressed by the following equation.

Eq. 1

$$V = \frac{V_1 + V_2}{r + 2Z} Z \qquad (1)$$

Here, r can be regarded as significantly smaller than Z, and thus the equation can be approximated as follows.

Eq. 2

$$V = \frac{1}{2}(V_1 + V_2) \qquad (2)$$

Table 2 shows the current direction at the terminal resistors Ra, Rb, and Rc.

TABLE 2

| first bit information | second bit information | third bit information | current direction at terminal resistor Ra | current direction at terminal resistor Rb | current direction at terminal resistor Rc |
|---|---|---|---|---|---|
| 0 | 0 | 1 | − | − | + |
| 0 | 1 | 0 | − | + | − |
| 0 | 1 | 1 | − | + | + |
| 1 | 0 | 0 | + | − | − |
| 1 | 0 | 1 | + | − | + |
| 1 | 1 | 0 | + | + | − |

In this way, the voltage that is applied to the signal lines 2a, 2b, and 2c of the differential transmission line 2 totals 0 regardless of the bit information signal that is transmitted, and noise that radiates from the signal lines 2a, 2b, and 2c cancels itself out, and thus transmission with little noise is possible.

<1.2: Multiple Differential Transmission System Including Differential Transmission Lines>

More specifically, here is described a multiple differential transmission system that includes the differential transmission line according to this embodiment of the invention.

<1.2.1: First Multiple Differential Transmission System>

Figure 8:
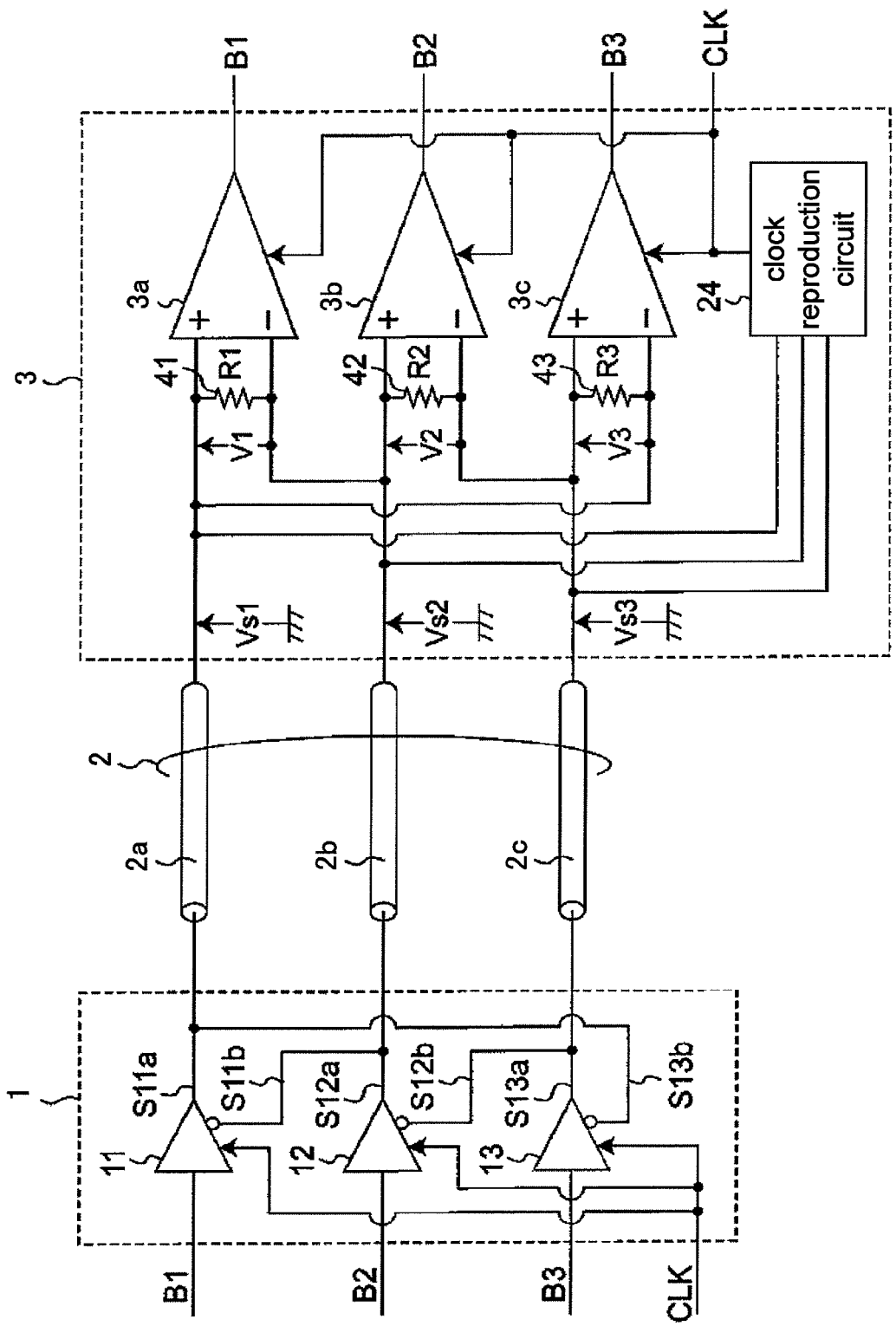
FIG. 8 is a block diagram showing the configuration of a first multiple differential transmission system that includes the differential transmission line (differential transmission cable) according to the first embodiment of the invention.

FIG. 8 is a block diagram that shows the configuration of a first multiple differential transmission system that includes the differential transmission line according to this embodiment of the invention. In FIG. 8, the first multiple differential transmission system is made by connecting a signal transmitter (differential driver IC) 1 and a signal receiver (differential receiver IC) 3 via a signal transmission route (differential transmission line) 2. The signal transmitter 1 is provided with (a) a differential driver 1a that outputs a first output signal S11a and an inverted first output signal S11b, whose phase is inverted compared to the first output signal 11a, in response to a bit information signal B1, which is either high or low level, (b) a differential driver 1b that outputs a second output signal S12a and an inverted second output signal S12b, whose phase is inverted compared to the second output signal 12a, in response to a bit information signal B2, which is either high or low level, and (c) a differential driver 1c that outputs a third output signal S13a and an inverted third output signal S13b, whose phase is inverted compared to the third output signal 13a, in response to a bit information signal B3, which is either high or low level. The binary voltage level of each output signal is ±1 V and these are equal to one another, and the differential drivers 1a, 1b, and 1c operate so as to send the output signals in synchronization with the rise in the clock CLK.

The signal transmission route (differential transmission line) 2 is made of signal lines 2a, 2b, and 2c. Here, the first output signal S11a from the differential driver 1a and the inverted third output signal S13b from the differential driver 1c are synthesized and then delivered to the signal line 2a. The second output signal S12a from the differential driver 1b and the inverted first output signal S11b from the differential driver 1a are synthesized and then delivered to the signal line 2b. The third output signal S13a from the differential driver 1c and the inverted second output signal S12b from the differential driver 1b are synthesized and then delivered to the signal line 2c.

The signal receiver 3 is made of three individual differential receivers 3a, 3b, and 3c, each of which are bit information decision devices (as described later using FIG. 14, they are made from comparators that determine whether or not the terminal voltages V1, V2, and V3 are negative), a clock reproduction circuit 24, and three terminal resistors 41, 42, and 43. The terminal resistor 41 is connected between the signal line 2a and the signal line 2b, and the direction of the current that flows to the terminal resistor 41 or the polarity of the terminal voltage V1 that is generated in the terminal resistor 41 is detected by the differential receiver 3a. The terminal resistor 42 is connected between the signal line 2b and the signal line 2c, and the direction of the current that flows to the terminal resistor 42 or the polarity of the terminal voltage V2 that is generated in the terminal resistor 42 is detected by the differential receiver 3b. The terminal resistor 43 is connected between the signal line 2c and the signal line 2a, and the direction of the current that flows to the terminal resistor 43 or the polarity of the terminal voltage V3 that is generated in the terminal resistor 43 is detected by the differential receiver 3c. The clock reproduction circuit 24 includes a rise detection circuit and a PLL circuit, and produces a clock CLK that has a predetermined period in response to detection of the rising edge of the transmitted signal that is transmitted to the three signal lines 2a, 2b, and 2c, and outputs the clock CLK to the differential receivers 3a, 3b, and 3c. The differential receivers 3a, 3b, and 3c execute a decision regarding the bit information, as described later, in synchronization with the rise in the clock CLK that is input, and output bit information signals B1, B2, and B3, respectively.

Figure 9:
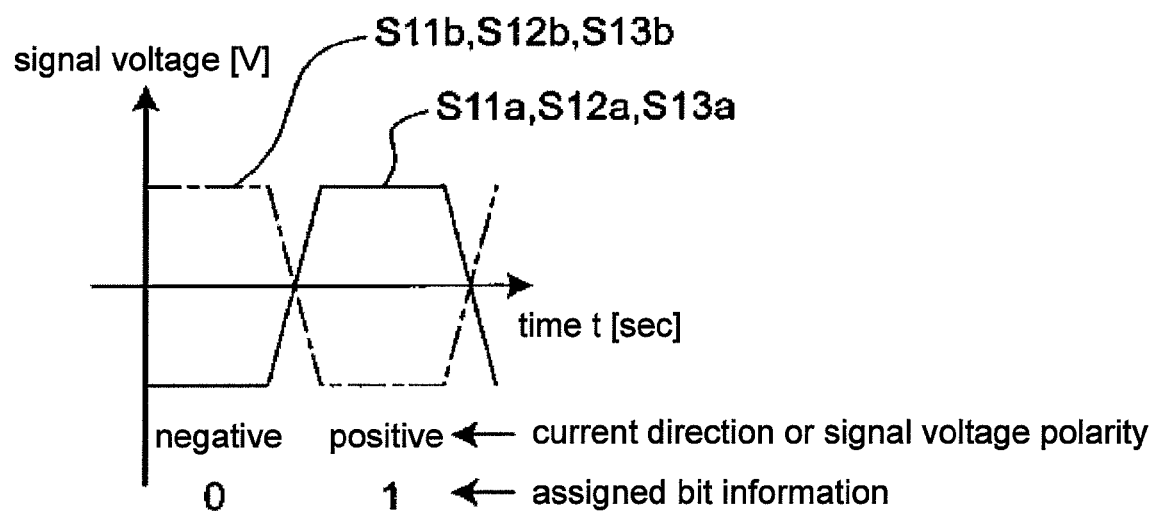
FIG. 9 is a waveform diagram that shows the relationship between the signal waveforms of the output signals S11a, S11b, S12a, S12b, S13a, and S13b of the differential drivers 1a, 1b, and 1c of FIG. 8, the definition of the current direction or the polarity of the signal voltage, and the assigned bit information.
Figure 10:
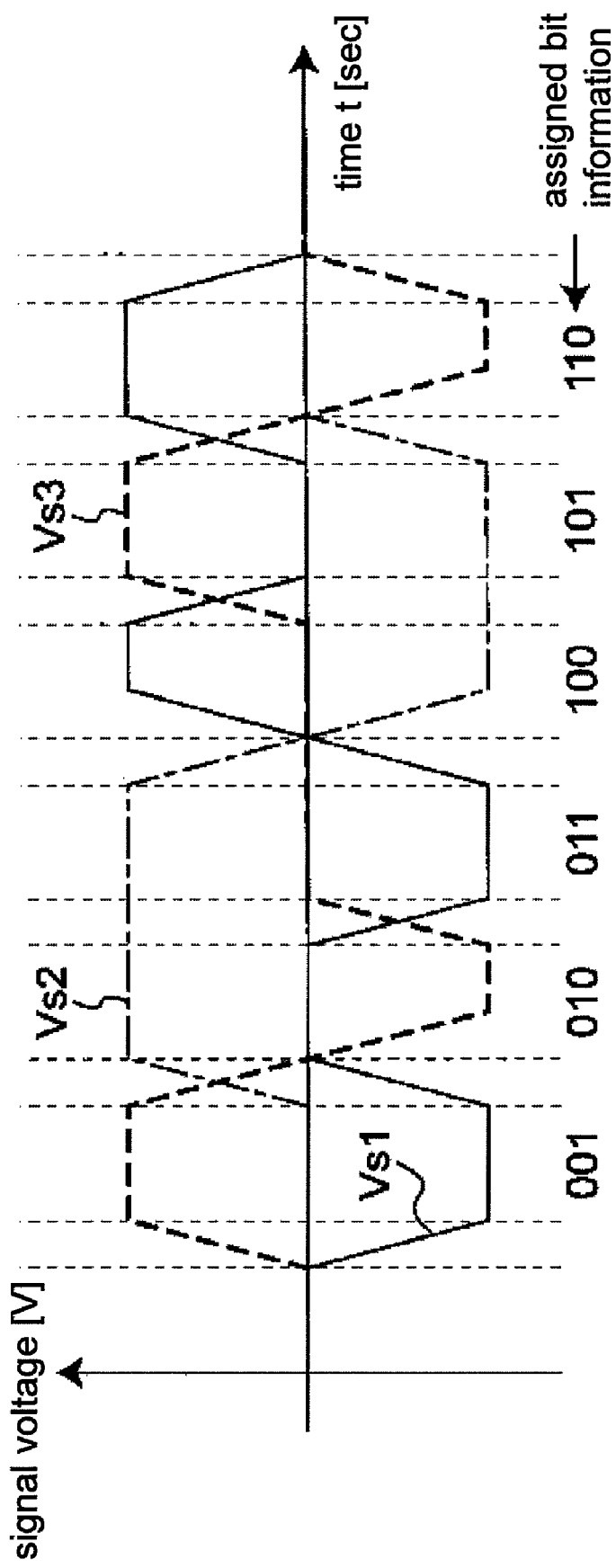
FIG. 10 is a waveform diagram that shows the relationship between the signal waveforms of the signal voltages Vs1, Vs2, and Vs3 of the transmitted signals that are transmitted via the signal lines 2a, 2b, and 2c of the signal transmission route (differential transmission line (differential transmission cable)) 2 of FIG. 8, and the bit information that is assigned.

FIG. 9 is a waveform diagram that shows the relationship between the signal waveforms of the output signals S11a, S11b, S12a, S12b, S13a, and S13b of the differential drivers 1a, 1b, and 1c of FIG. 8, a definition of the current direction or the polarity of the signal voltage, and the assigned bit information, and FIG. 10 is a waveform diagram that shows the relationship between the signal waveforms of the signal voltages Vs1, Vs2, and Vs3 of the transmitted signals that are transmitted via the signal lines 2a, 2b, and 2c of the signal transmission route (differential transmission line) 2 of FIG. 8, and the bit information that is assigned. The differential receivers 3a, 3b, and 3c output the output signals shown in FIG. 9 in accordance with the bit information signals that are input, and, at this time, the signal voltages Vs1, Vs2, and Vs3 of the transmitted signals that are transmitted via the signal lines 2a, 2b, and 2c of the signal transmission route (differential transmission line) 2 in accordance with the three-bit bit information signals that are input are shown in FIG. 10.

Figure 12:
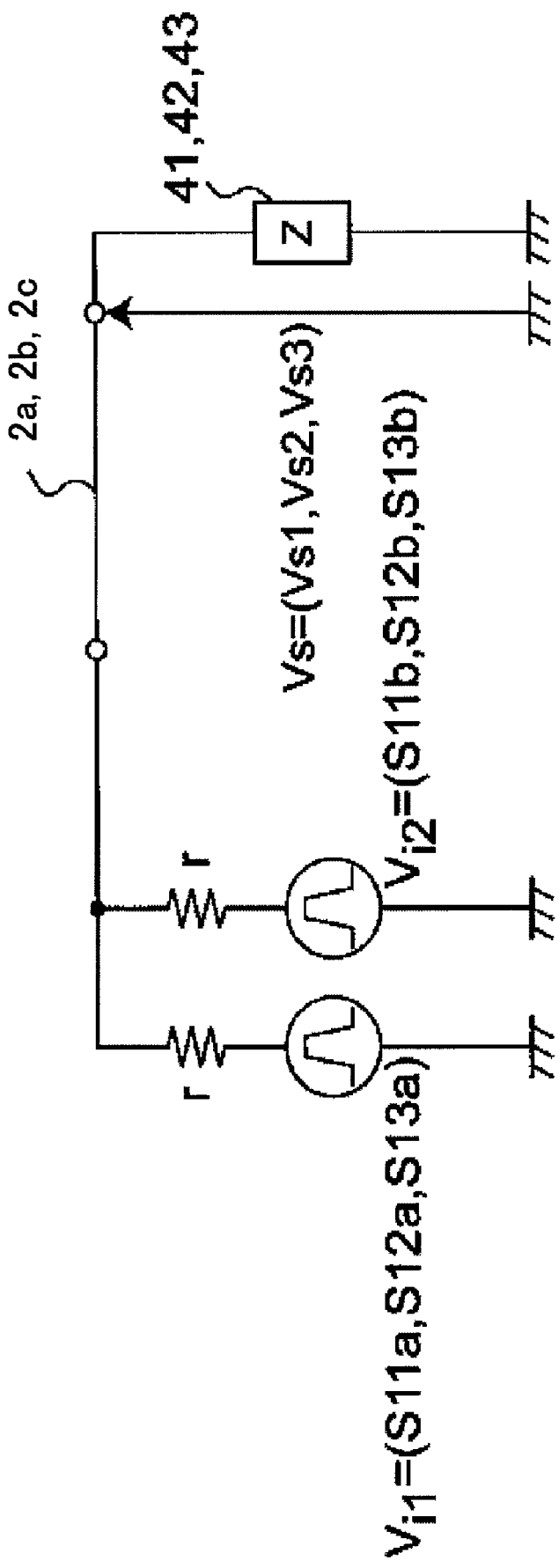
FIG. 12 is a circuit diagram that shows an equivalent network of the signal transmitter 1 and the signal lines 2a, 2b, and 2c, for describing the signal voltages Vs1, Vs2, and Vs3 of the signal lines 2a, 2b, and 2c of FIG. 8.

FIG. 11 is a diagram that shows the relationship between the bit information that is transferred, and the signal voltages Vs1, Vs2, and Vs3 of the transmitted signals that are transmitted by the signal lines 2a, 2b, and 2c of the signal transmission route (differential transmission line) 2, in the multiple differential transmission system of FIG. 8, and FIG. 12 is a circuit diagram that shows an equivalent network of the signal transmitter 1 and the signal lines 2a, 2b, and 2c, for describing the signal voltages Vs1, Vs2, and Vs3 of the signal lines 2a, 2b, and 2c of FIG. 8. The signal voltages Vs1, Vs2, and Vs3 of the signal lines 2a, 2b, and 2c are described here in reference to FIG. 11 and FIG. 12.

The signal voltages Vi1 and Vi2 from two differential drivers (1a,1b; 1b,1c; 1c,1a) are superimposed in the signal lines 2a, 2b, and 2c. With r as the internal resistance of the differential drivers 1a, 1b, and 1c, and Z as the impedance of the terminal resistors 41, 42, and 43 of the signal receiver 3 (the input impedance of the differential receivers 3a, 3b, and 3c is infinite (ideal value)), the signal voltage Vs that is generated in the signal lines 2a, 2b, and 2c is represented by the following equation.

Eq. 3
$$V_S = \frac{V_{i1} + V_{i2}}{r + 2Z} Z \qquad (3)$$

Here, r can be regarded as significantly smaller than Z, and thus the equation can be approximated as follows.

Eq. 4
$$V_S = \frac{1}{2}(V_{i1} + V_{i2}) \qquad (4)$$

FIG. 13 is a diagram that shows the relationship between the bit information that is transmitted, and the polarity of the terminal voltages V1, V2, and V3 of the terminal resistors 41, 42, and 43 of the signal receiver 3, in the multiple differential transmission system of FIG. 8.

From FIG. 13 it can be understood that by determining the current direction or the polarity of the terminal voltage from the potential difference that occurs between a pair of adjacent signal lines when superimposed on the three signal lines 2a, 2b, and 2c (the terminal voltages of the terminal resistors 41, 42, and 43), it is possible to decode the bit information signal that has been output by the differential drivers 1a, 1b, and 1c in six states other than when all bits are 0 or 1. Further, the signal voltage that is applied to the signal lines 2a, 2b, and 2c of the signal transmission route (differential transmission line) 2 totals 0 in all cases where the bit information signal is transmitted, and the noise that radiates from the signal lines 2a, 2b, and 2c cancels itself out, and thus, like with the normal signal transmission method, it is possible to achieve transmission in which there is little noise.

Figure 14:
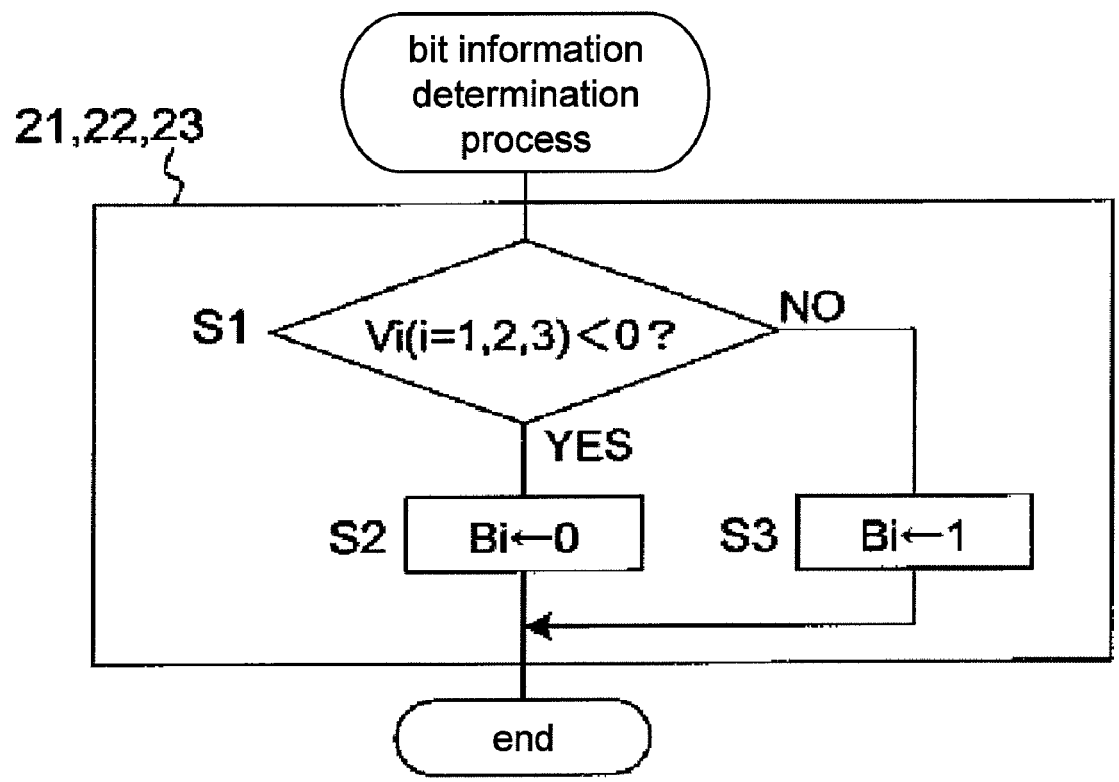
FIG. 14 is a flowchart that illustrates the bit information determination process that is executed by the differential receivers 3a, 3b, and 3c of the signal receiver 3 of FIG. 8.

FIG. 14 is a flowchart that illustrates the bit information decision process that is executed by the differential receivers 3a, 3b, and 3c of the signal receiver 3 of FIG. 8.

In FIG. 14, first in step S1 the differential receivers 3a, 3b, and 3c determine whether the current flowing to the terminals 41, 42, and 43 is negative, or whether the terminal voltage Vi (i=1, 2, 3) of the terminal resistors 41, 42, and 43 is negative. When the result is YES, the procedure advances to step S2 and a 0 is set for the bit information Bi, and when the result is NO, then the procedure advances to step S3 and a 1 is set for the bit information Bi. The bit information decision process is then ended.

(1.2.2: Second Multiple Differential Transmission System)

Figure 15:
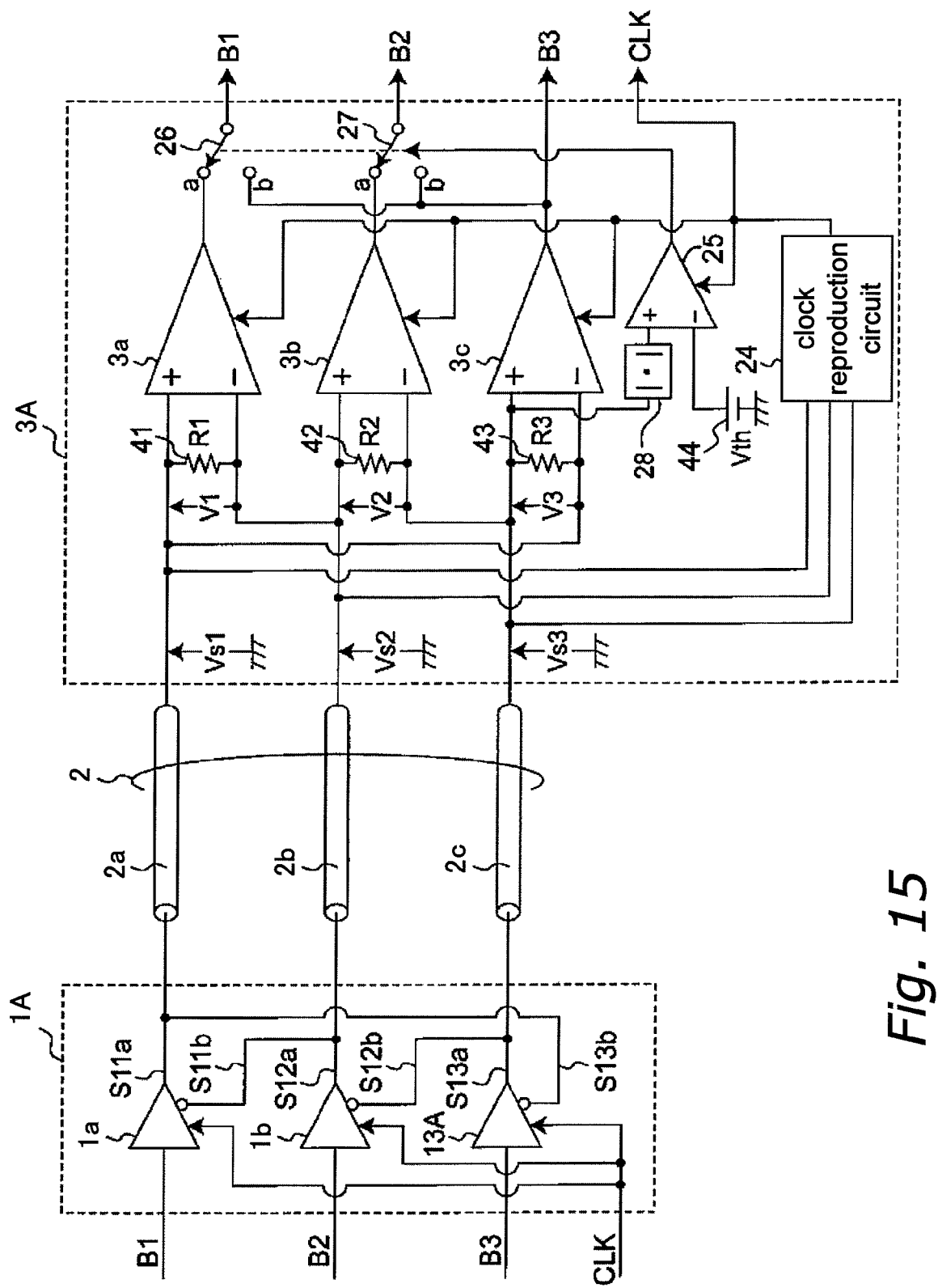
FIG. 15 is a block diagram that shows the configuration of a second multiple differential transmission system that includes the differential transmission line (differential transmission cable) according to the first embodiment of the invention.

FIG. 15 is a block diagram that shows the configuration of a second multiple differential transmission system that includes the differential transmission line according to this embodiment of the invention. In FIG. 15, the second multiple differential transmission system is made by connecting a signal transmitter (differential driver IC) 1A and a signal receiver (differential receiver IC) 3A via a signal transmission route (differential transmission line) 2. Like in the first multiple differential transmission system, the signal transmitter 1A is provided with three differential drivers 1a, 1b, and 13A, the method of connecting the differential drivers 1a, 1b, and 13A with the signal lines 2a, 2b, and 2c is the same as in the first multiple differential transmission system, and the binary voltage levels of the output signals of the differential driver 1a and the differential driver 1b are equal to ±1 V, whereas the binary voltage level of the output signal of the differential driver 13A is equal to ±1.5 V, and its absolute value is set higher than the differential drivers 1a and 1b.

The signal receiver 3A is characterized over the signal receiver 3 of the first multiple differential transmission system in that it further includes a comparator 25 that has a threshold voltage source 44, switches 26 and 27 that are operated to switch by an output signal from the comparator 25, and an absolute value calculator 28. In the second multiple differential transmission system, the absolute value calculator 28 detects the terminal voltage V3 of the terminal resistor 43 and then calculates its absolute value |V3| and outputs a voltage signal that indicates this to the non-inverted input terminal of the comparator 25. The comparator 25 compares the absolute value |V3| of the terminal voltage V3 with the threshold voltage Vth from the threshold voltage source 44, and when |V3|>|Vth|, it outputs a high level control signal to the switches 26 and 27 to cause the switches 26 and 27 to switch to a contact a, whereas when |V3|≦|Vth|, it outputs a low level control signal to the switches 26 and 27 to cause the switches 26 and 27 to switch to a contact b. The differential receivers 3a, 3b, and 3c execute the bit information determination as discussed above in synchronization with the clock CLK that is input, and output bit information signals B1, B2, and B3, respectively. Here, when the switches 26 and 27 have been switched to the contact a (the processing of steps S21 to S23 is executed when YES in step S11 in FIG. 19), the bit information signal B1 is output from the differential receiver 3a via the contact a of the switch 26, the bit information signal B2 is output from the differential receiver 3b via the contact a of the switch 27, and the bit information signal B3 is output from the differential receiver 3c as it is. On the other hand, when the switches 26 and 27 have been switched to the contact b (the processing of steps S12 to S14 is executed when NO in step S1 in FIG. 19), a bit information signal whose determination result (000 or 111) of the bit information signal B3 from the differential receiver 3c is output as the bit information signals B1, B2, and B3.

When Vd1, Vd2, and Vd3 are the absolute values of the binary signal voltages of the output signals of the differential drivers 1a, 1b, and 13A, then with the settings of the second multiple differential transmission system (Vd3>Vd1 (for example, when Vd1=Vd2=1.0 V; Vd3=1.5 V), a method of distinguishing the bit information signals 000 and 111 from all other bit information signals can be executed under the following conditions.

(1) |Vd1|=|Vd2|

(2) |Vd3|≠|Vd1|: Because when Vd3=Vd1, and bit information signals 000 and 111 are transmitted, the potential difference between the signal lines becomes 0, making the determination impossible.

(3) |Vd3|≠|3Vd1|: Because when Vd3=3Vd1, and bit information signals 010 to 101 are transmitted, the potential difference of 0 occurs between the signal lines, making the determination impossible.

(4) |Vd3|>|Vd1|/2: Because the threshold value |Vth| becomes 0 or lower, making the determination impossible.

(5) |Vd1−Vd3|<|Vth|: This is the threshold value condition. Thus, determination is possible only with the comparator 25 and the absolute value calculator 28.

In the first setting example, the threshold value Vth is set to 0.5 V<Vth<1.0 V, and for example Vth=0.8 V.

Figure 16:
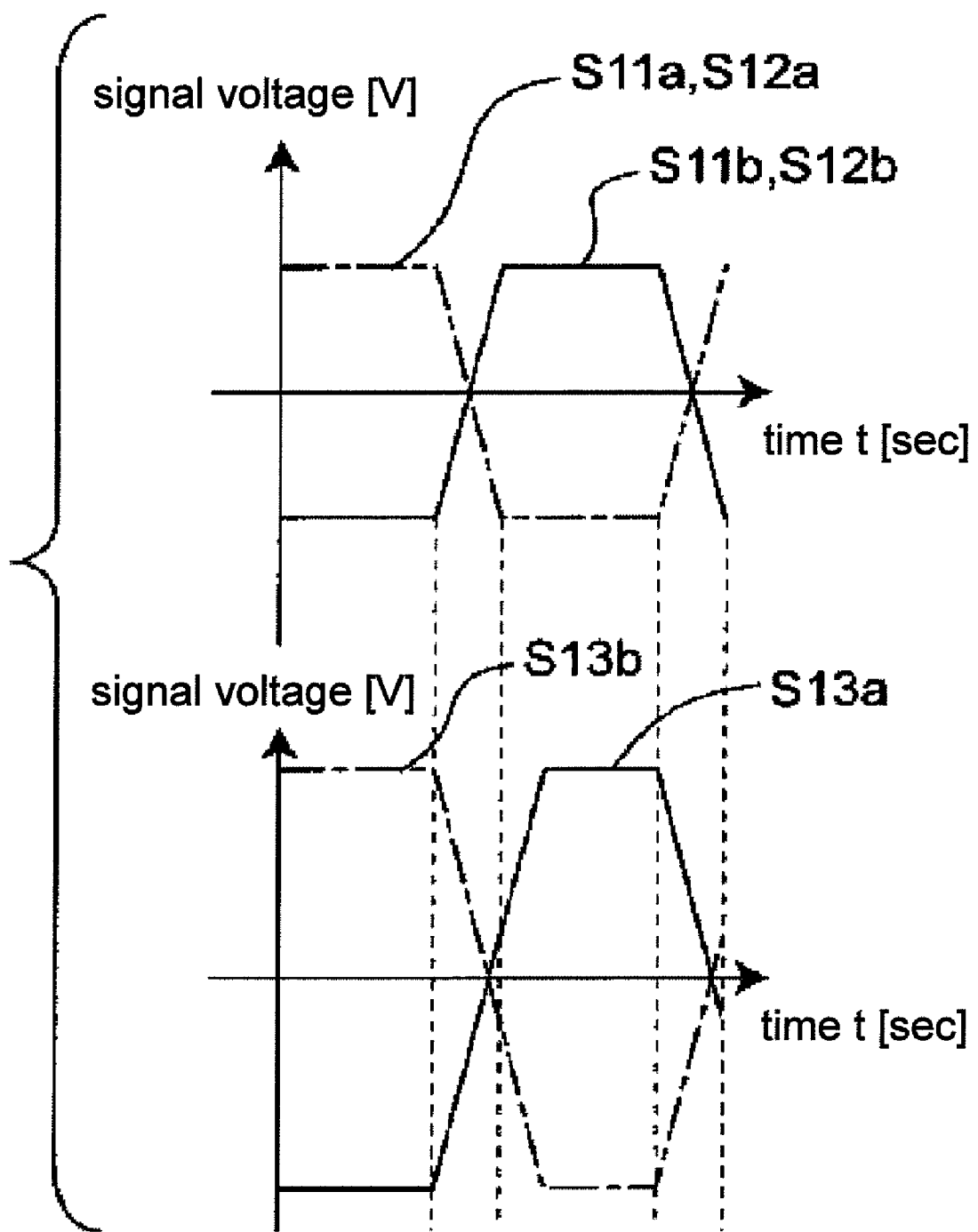
FIG. 16 is a signal waveform diagram that shows the signal waveforms of the output signals S11a, S11b, S12a, S12b, S13a, and S13b of the differential drivers 1a, 1b, and 13A of FIG. 15.
Figure 17:
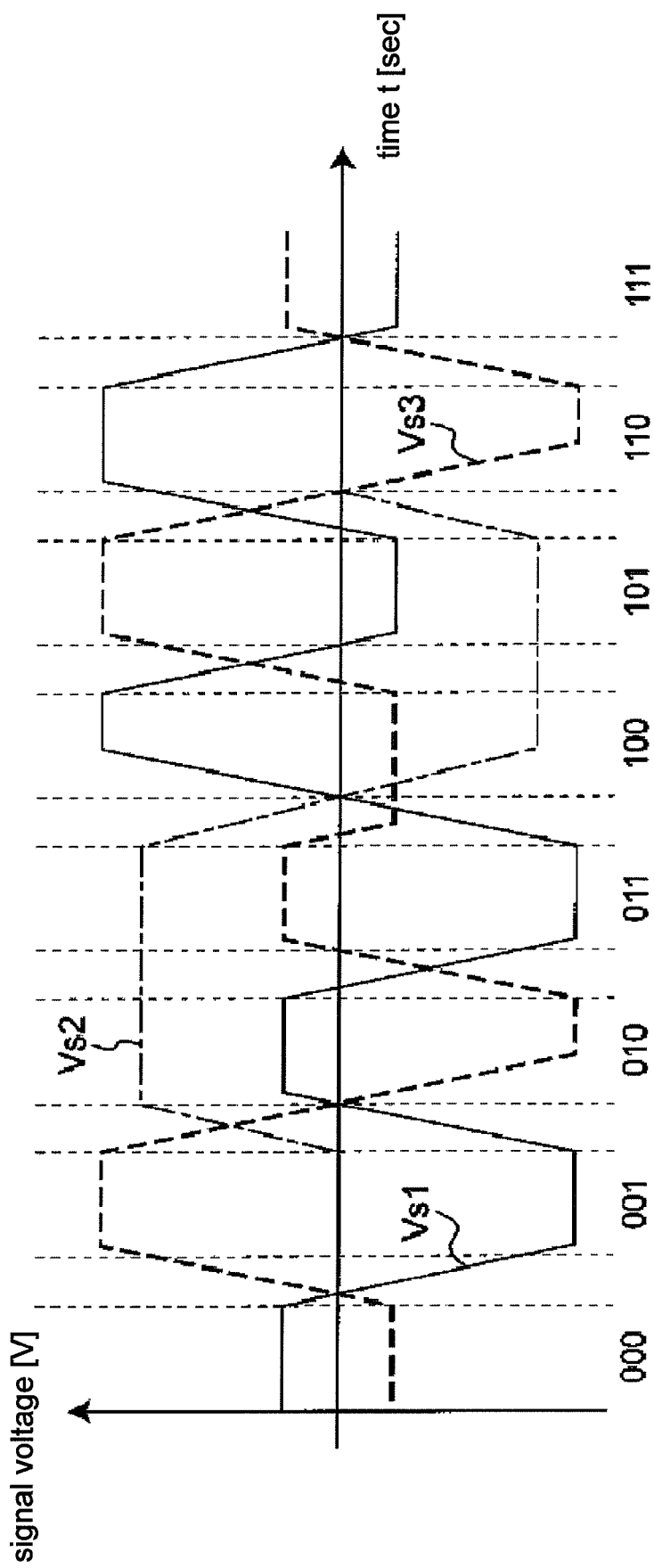
FIG. 17 is a waveform diagram that shows the relationship between the signal waveforms of the signal voltages Vs1, Vs2, and Vs3 of the transmitted signals that are transmitted via the signal lines 2a, 2b, and 2c of the signal transmission route (differential transmission line (differential transmission cable)) 2 in FIG. 15, and the bit information that is assigned.

FIG. 16 is a signal waveform diagram that shows the signal waveforms of the output signals S11a, S11b, S12a, S12b, S13a, and S13b of the differential drivers 1a, 1b, and 13A of FIG. 15. FIG. 17 is a waveform diagram that shows the relationship between the signal waveforms of the signal voltages Vs1, Vs2, and Vs3 of the transmitted signals that are transmitted via the signal lines 2a, 2b, and 2c of the signal transmission route (differential transmission line) 2 in FIG. 15, and the bit information that is assigned. Further, FIG. 18 is a diagram that shows the relationship between the bit information that is transmitted, the signal voltages Vs1, Vs2, and Vs3 of the transmitted signals that are transmitted over the signal lines 2a, 2b, and 2c, and the terminal voltages V1, V2 and V3, and their polarities, of the terminal resistors 41, 42, and 43 of the signal receiver 3A, in the multiple differential transmission system of FIG. 15.

As described above, by setting only the signal voltage level of only the one differential driver 13A to a different value than the signal voltage levels of the other differential drivers 1a and 1b, and providing the circuit elements 25 through 28, which form a total bit compensation circuit, it is possible to decode the bit information signal in all eight states, including instances where all bits are 0 or 1. The signal voltage that is applied to the signal lines 2a, 2b, and 2c of the signal transmission route (differential transmission line) 2 totals 0 regardless of the bit information that is transmitted, such that the noise that radiates from the signal lines 2a, 2b, and 2c cancels itself out, and thus, like in ordinary differential transmission, it is possible to achieve transmission in which there is little noise.

Figure 19:
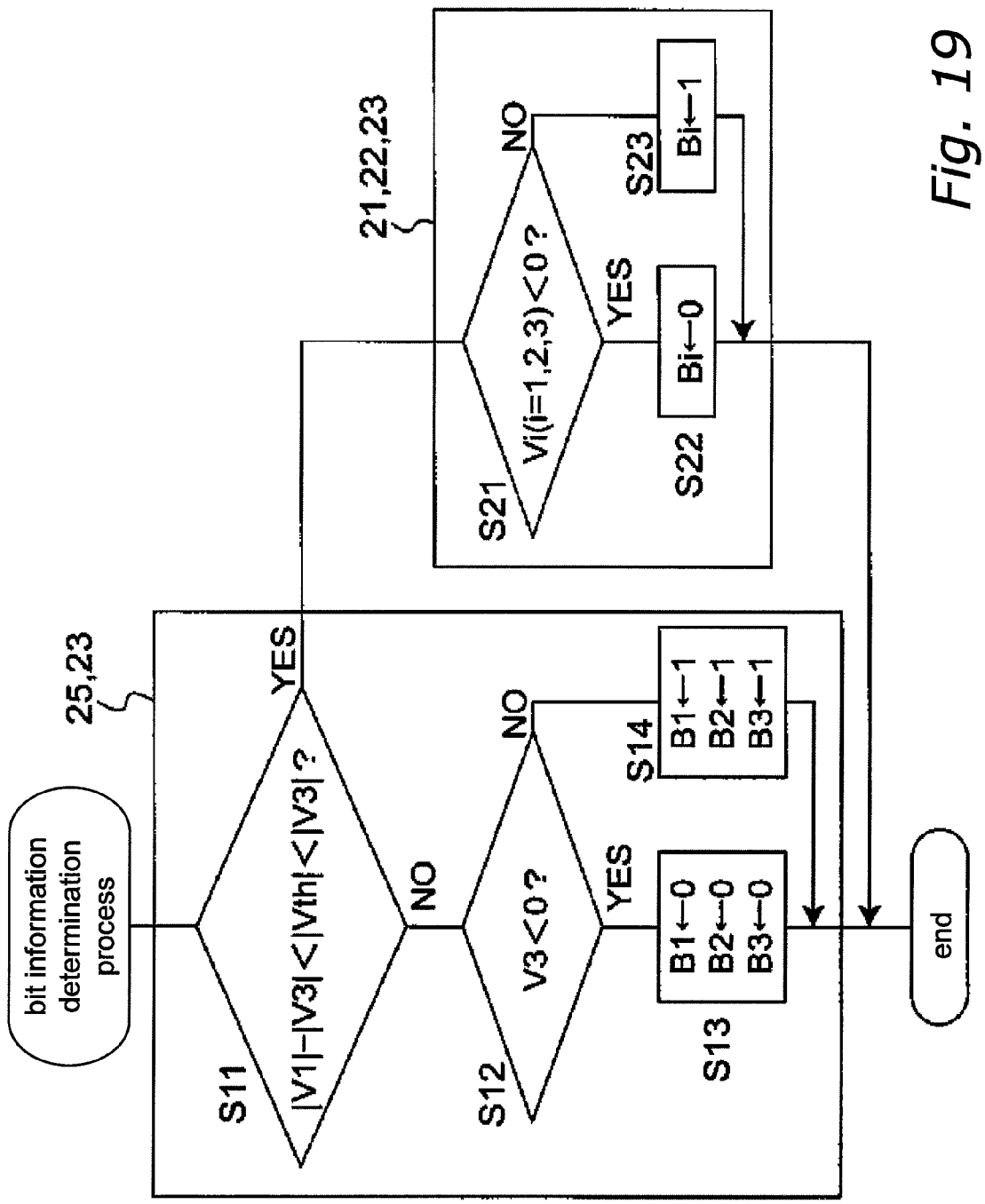
FIG. 19 is a flowchart that shows a first working example of the bit information determination process that is executed by the differential receivers 3a, 3b, and 3c of the signal receiver 3A and the comparator 25 in the multiple differential transmission system of FIG. 15.

FIG. 19 is a flowchart that shows a first working example of the bit information determination process that is executed by the differential receivers 3a, 3b, and 3c of the signal receiver 3A and the comparator 25 in the multiple differential transmission system of FIG. 15.

In FIG. 19, first in step S11 the comparator 25 determines whether or not the absolute value |V3| of the terminal voltage V3 of the terminal resistor 43 exceeds the threshold value Vth. It should be noted that in this multiple transmission system, |V1−V3|<|Vth| has been set in advance in accordance with the above threshold value conditions (|Vd1−Vd3|<|Vth|). When step S11 is NO the procedure advances to step S12, and when YES the procedure advances to step S21, and the differential receivers 3a, 3b, and 3c determine whether or not the terminal voltage Vi (i=1, 2, 3) of the terminal resistors 41, 42, and 43 is negative polarity, and when YES the procedure advances to step S22 and 0 is set as the bit information signal Bi, whereas when NO the procedure is advanced to step S23 and 1 is set as the bit information Bi. The bit information determination processing is then ended. In step S12 it is determined whether the terminal voltage V3 of the terminal resistor 43 is negative, and if YES, the procedure advances to step S13 and all bit information signals B1, B2, and B3 are set to 0, whereas if NO, the procedure advances to step S14 and all bit information signals B1, B2, and B3 are set to 1. The bit information determination process is then ended.

Modified Example

Figure 20:
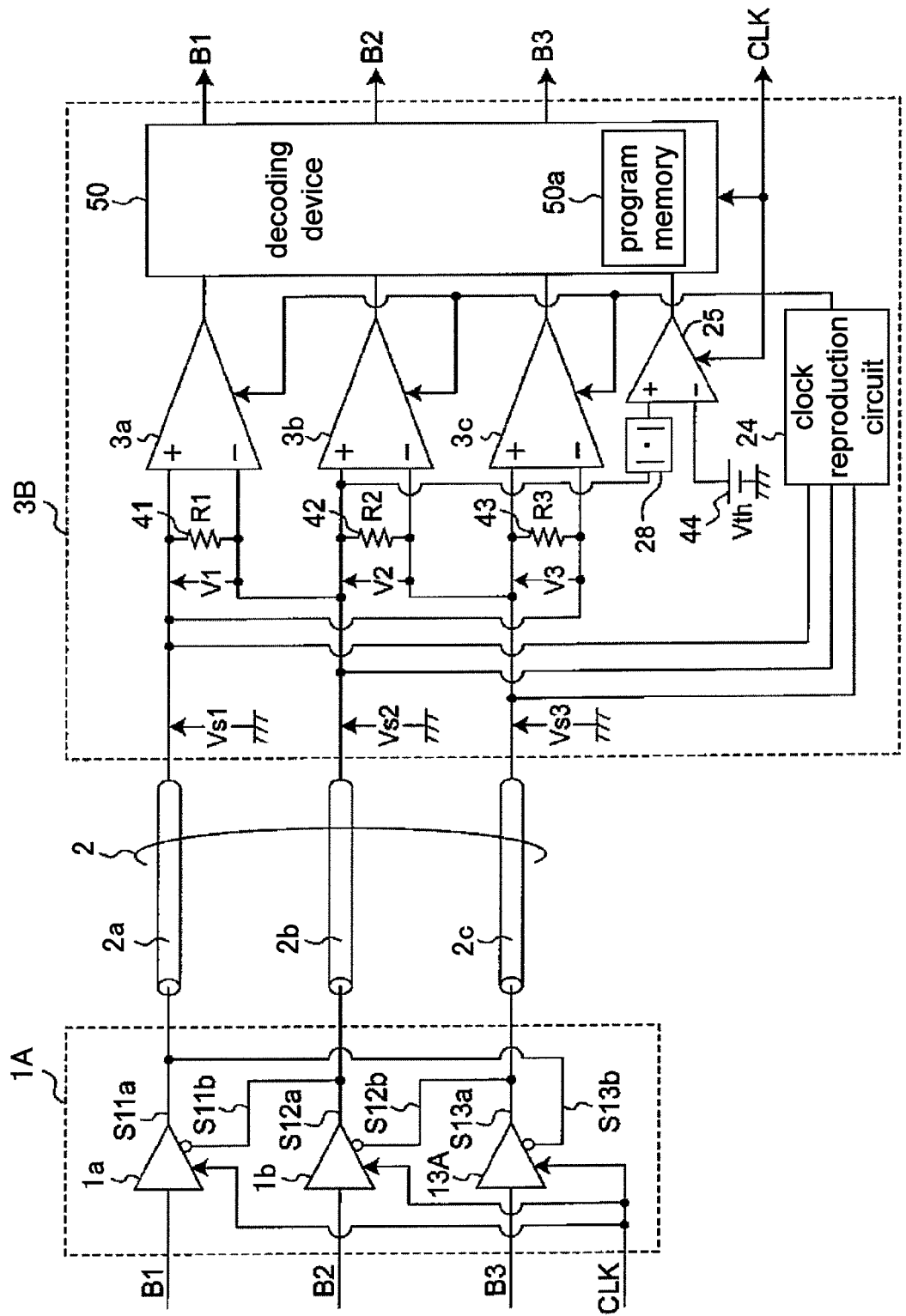
FIG. 20 is a block diagram that shows the configuration of a multiple differential transmission system according to a modified example of the second multiple differential transmission system.

FIG. 20 is a block diagram that shows the configuration of a multiple differential transmission system according to a modified example of the second multiple differential transmission system. The multiple differential transmission system of this modified example is characterized in that, compared to the second multiple differential transmission system of FIG. 15, it is provided with a signal receiver 3B instead of the signal receiver 3A, and the signal receiver 3B is provided with a decoding device 50 that has a program memory 50a and that executes the bit information determination process of FIG. 21 (which is pre-stored in the program memory 50a) instead of the switches 26 and 27, as shown in FIG. 20. It should be noted that the absolute value calculator 28 detects the terminal voltage V2 of the terminal resistor 42 and calculates the absolute value |V2|=|V1+V31| and outputs a signal that indicates the result of this calculation to the non-inverted input terminal of the comparator 25.

In the multiple differential transmission system according to this modified example, a method of distinguishing the bit information signals 000 and 110, and 111 and 000, can be executed under the following conditions.

(1) |Vd1|=|Vd2|

(2) |Vd3|≠|Vd1|: Because when Vd3=Vd1, and the bit information signals 000 and 111 are transmitted, the potential difference between the signal lines becomes 0, making the determination impossible.

(3) |Vd3|≠|3Vd1|: Because when Vd3=3Vd1, and bit information signals 010 to 101 are transmitted, a potential difference of 0 occurs between the signal lines, making the determination impossible.

(4) |Vd1−Vd3|<|Vth|: This is the threshold value condition. Thus, determination is possible only with the comparator 25 and the absolute value calculator 28. It should be noted that in FIG. 20, the absolute value calculator 28 computes the absolute value |V2| of the terminal voltage V2 and outputs this to the comparator 25.

Figure 21:
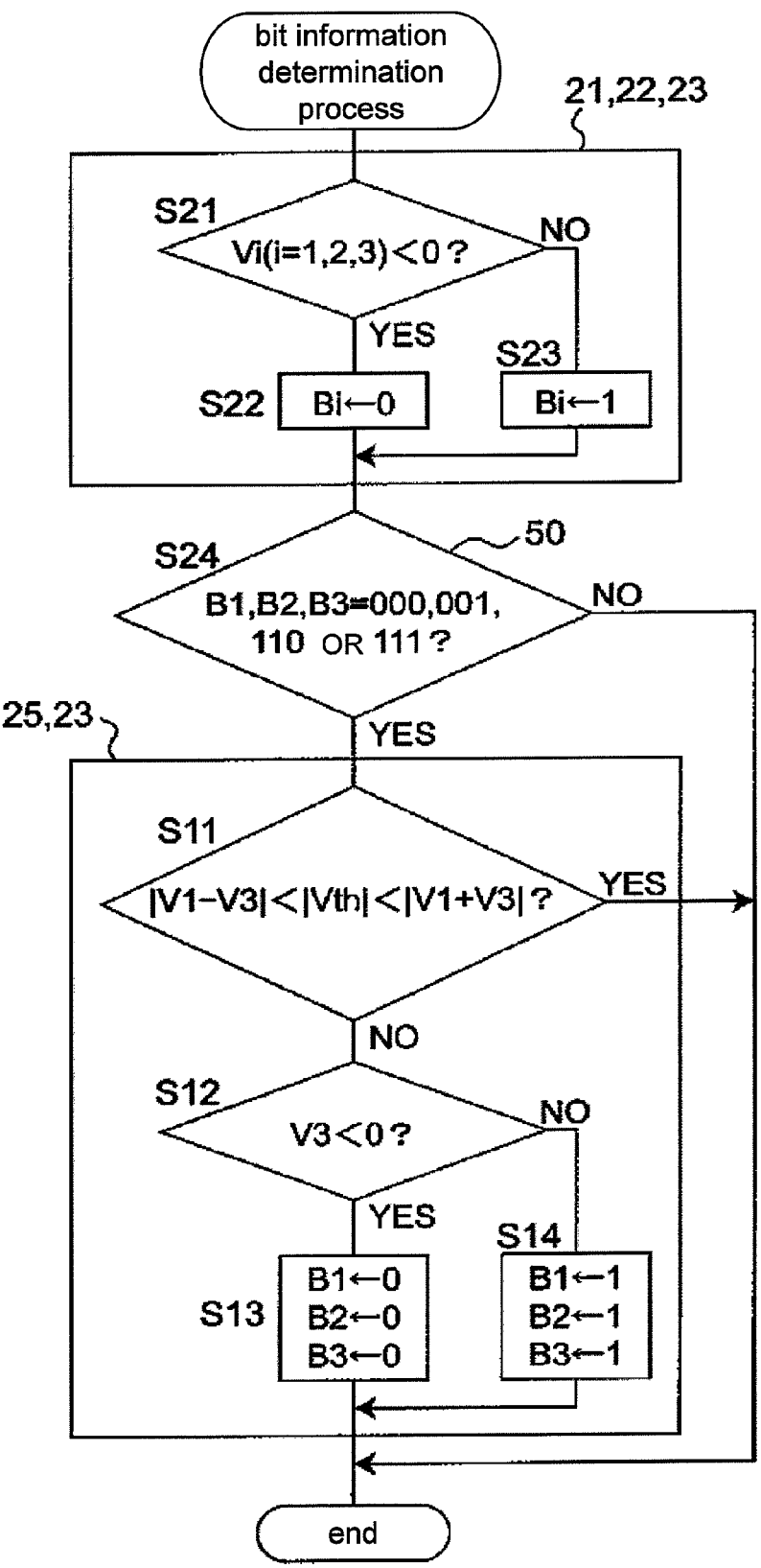
FIG. 21 is a flowchart that shows a second working example of the bit information determination process that is executed by the decoding device 50 of the signal receiver 3B in the multiple differential transmission system of FIG. 20.

In FIG. 20, the decoding device 50 is constituted by a CPU or DSP, for example, and executes a decoding process by executing the bit information determination processing of FIG. 21, which is stored on the program memory 50a, in accordance with the signals from the differential receivers 3a, 3b, and 3c and the comparator 25, in synchronization with the clock from the clock reproduction circuit 24, to produce the bit information signals B1, B2, and B3, and outputs these.

FIG. 21 is a flowchart that shows a second working example of the bit information processing that is executed by the decoding device 50 of the signal receiver 3B in the multiple differential transmission system of FIG. 20. In FIG. 21, the steps S21 to S23 are processes that are executed by the differential receivers 3a, 3b, and 3c, step S24 is a process that is executed by the decoding device 50 only, and step S11 through S14 are processes that are executed by the differential receiver 3c and the comparator 25.

In FIG. 21, first the differential receivers 3a, 3b, and 3c determine whether or not the terminal voltage Vi (i=1, 2, 3) of the terminal resistors 41, 42, and 43 is negative polarity, and when YES the procedure advances to step S22 and 0 is set as the bit information signal Bi, whereas when NO the procedure advances to step S23 and 1 is set as the bit information Bi, and then the procedure advances to step S24. In step S24 it is determined whether or not the bit information signals B1, B2, and B3 are 000, 001, 110, or 111, and when YES the procedure advances to step S11, whereas when NO the bit information determination process is ended. In step S11 the comparator 25 determines whether or not the absolute value |V2|=|V1+V3| of the terminal voltage V2 of the terminal resistor 43 exceeds the threshold value Vth. It should be noted that in this example, |V1-V3|<|Vth| has been set in advance in accordance with the above threshold value conditions (|Vd1−Vd3|<|Vth|). When step S11 is NO the procedure advances to step S12, and when YES the bit information determination process is ended. In step S12 it is determined whether the terminal voltage V3 of the terminal resistor 43 is negative, and when YES the procedure advances to step S13 and all bit information signals B1, B2, and B3 are set to 0, whereas when NO the procedure advances to step S14 and all bit information signals B1, B2, and B3 are set to 1.

(1.2.3: Third Multiple Differential Transmission System)

FIG. 22 is a diagram that shows the relationship between the bit information that is transmitted, the signal voltages Vs1, Vs2, and Vs3 of the transmitted signals that are transmitted over the signal lines 2a, 2b, and 2c, and the terminal voltages V1, V2, and V3, and their polarities, of the terminal resistors 41, 42, and 43 of the signal receiver 3 (or 3A), in a third multiple differential transmission system that includes the differential transmission line according to this embodiment of the invention (using the configuration of FIG. 15, differing only in the setting conditions). The third multiple differential transmission system differs from the second multiple differential transmission system only in its setting conditions, and is characterized in that Vd3<Vd1 (for example, Vd1=Vd2=1.0 V; Vd3=0.8 V). It should be noted that the structural configuration of the multiple differential transmission system of FIG. 15 is used.

Figure 23:
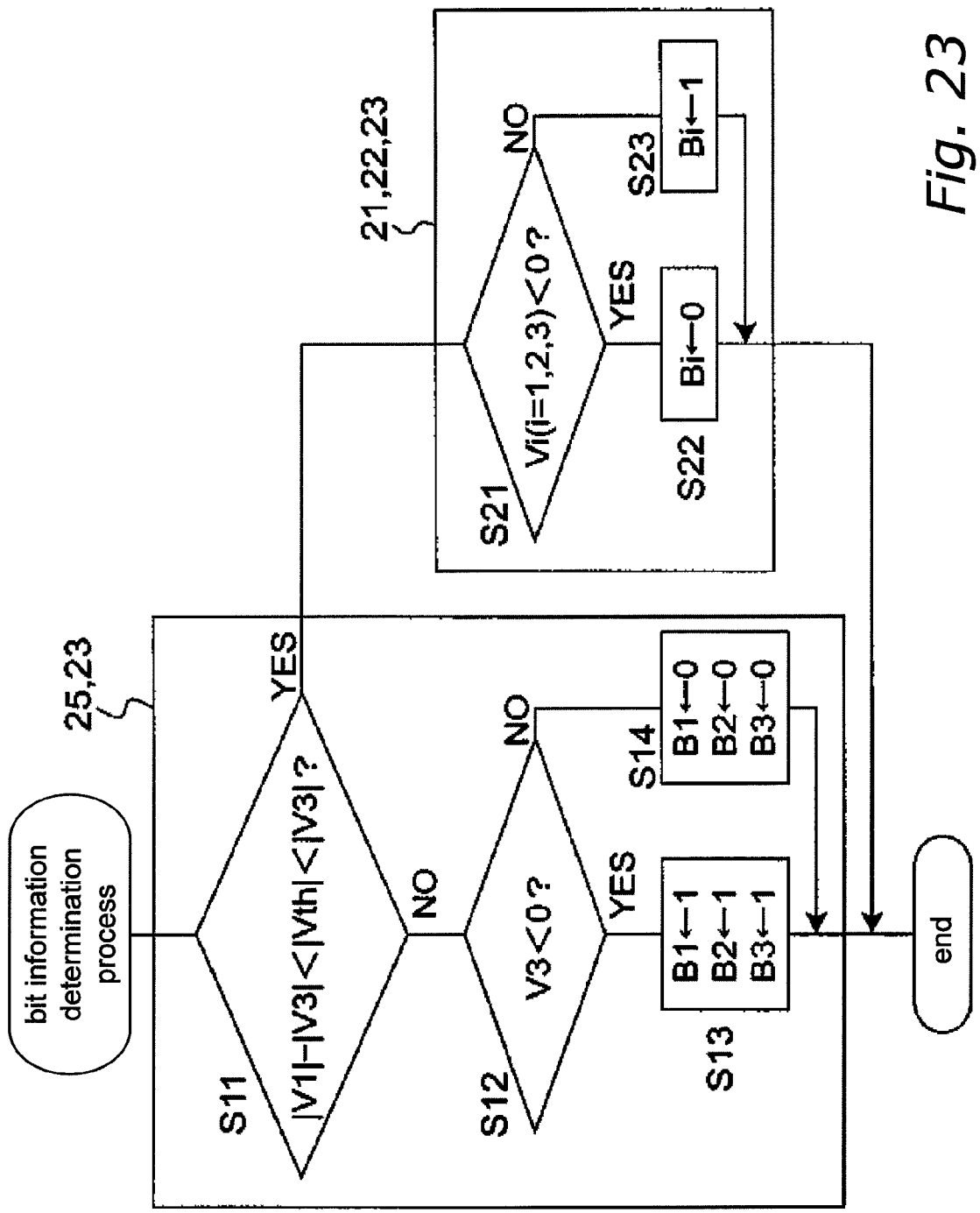
FIG. 23 is a flowchart illustrating a third working example of the bit information determination process that is executed by the differential receivers 3a, 3b, and 3c of the signal receiver 3B and the comparator 25 in the third multiple differential transmission system.

FIG. 23 is a flowchart illustrating a third working example of the bit information determination process that is executed by the differential receivers 3a, 3b, and 3c of the signal receiver 3A and the comparator 25 in the third multiple differential transmission system. The bit information determination process of FIG. 23 differs from the bit information determination process of FIG. 19 only in that the processing of step S13 has been switched with the processing of step S14. The third multiple differential transmission system having the above configuration has the same actions and effects as the second multiple differential transmission system.

Modified Example

Figure 24:
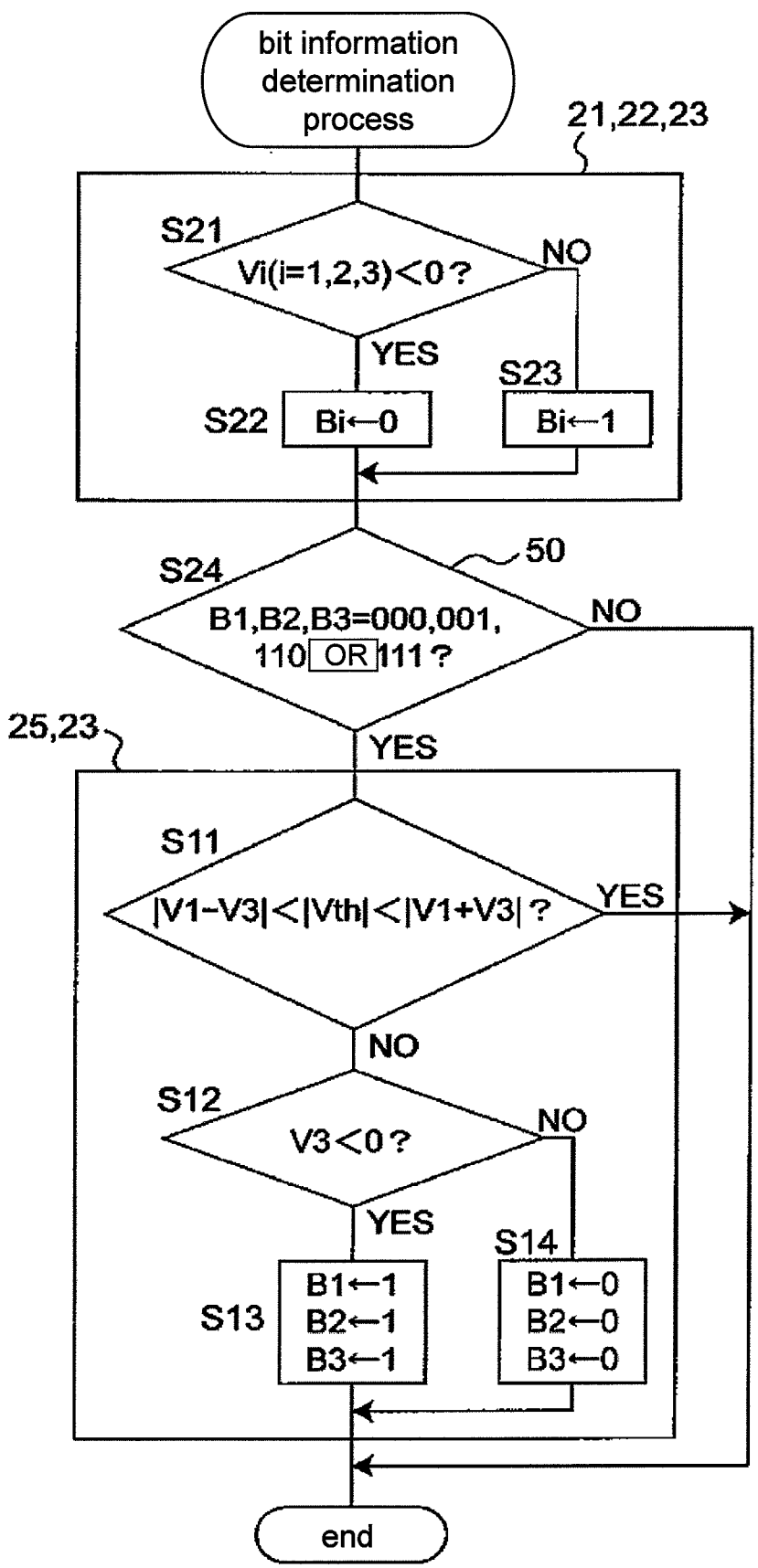
FIG. 24 is a flowchart that illustrates a fourth example of the bit information determination process that is executed by the decoding device 50 of the signal receiver 3B in a multiple differential transmission system according to a modified example of the third multiple differential transmission system (using the configuration of FIG. 20, differing only in the setting conditions).
Figure 25:
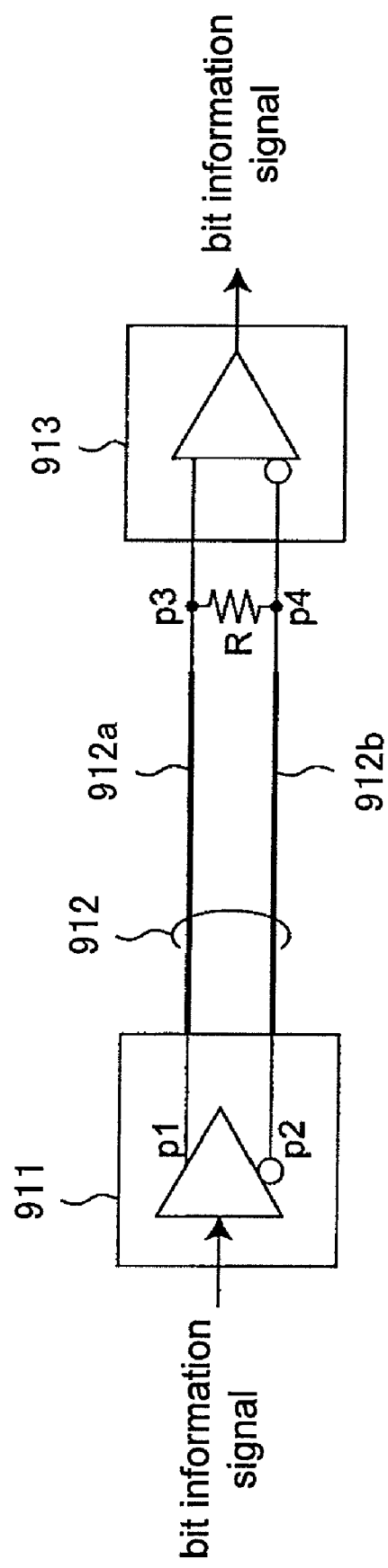
FIG. 25 is a circuit diagram of a differential transmission circuit according to a first conventional technology.

FIG. 24 is a flowchart that illustrates this example of the bit information determination process that is executed by the decoding device 50 of the signal receiver 3B in a multiple differential transmission system according to a modified example of the third multiple differential transmission system (using the configuration of FIG. 20, differing only in the setting conditions). Here, the structural configuration of the multiple differential transmission system of FIG. 20 is used. The bit information determination process of FIG. 24 differs from the bit information determination process of FIG. 21 only in that the processing of step S13 has been switched with the processing of step S14. This multiple differential transmission system according to a modified example of the third multiple differential transmission system with this configuration has the same actions and effects as the multiple differential transmission system according to the modified example of the second multiple differential transmission system.

As described above, the differential transmission cable 2 of this embodiment can easily keep the three signal lines 2a, 2b, and 2c at an even spacing, and thus the differential impedances can be kept constant and the electromagnetic field that is generated by the signal current cancels itself out, and therefore it is possible to achieve a multiple differential transmission cable that has little unwanted radiation noise.

Modified Example of the First Embodiment

Figure 4:
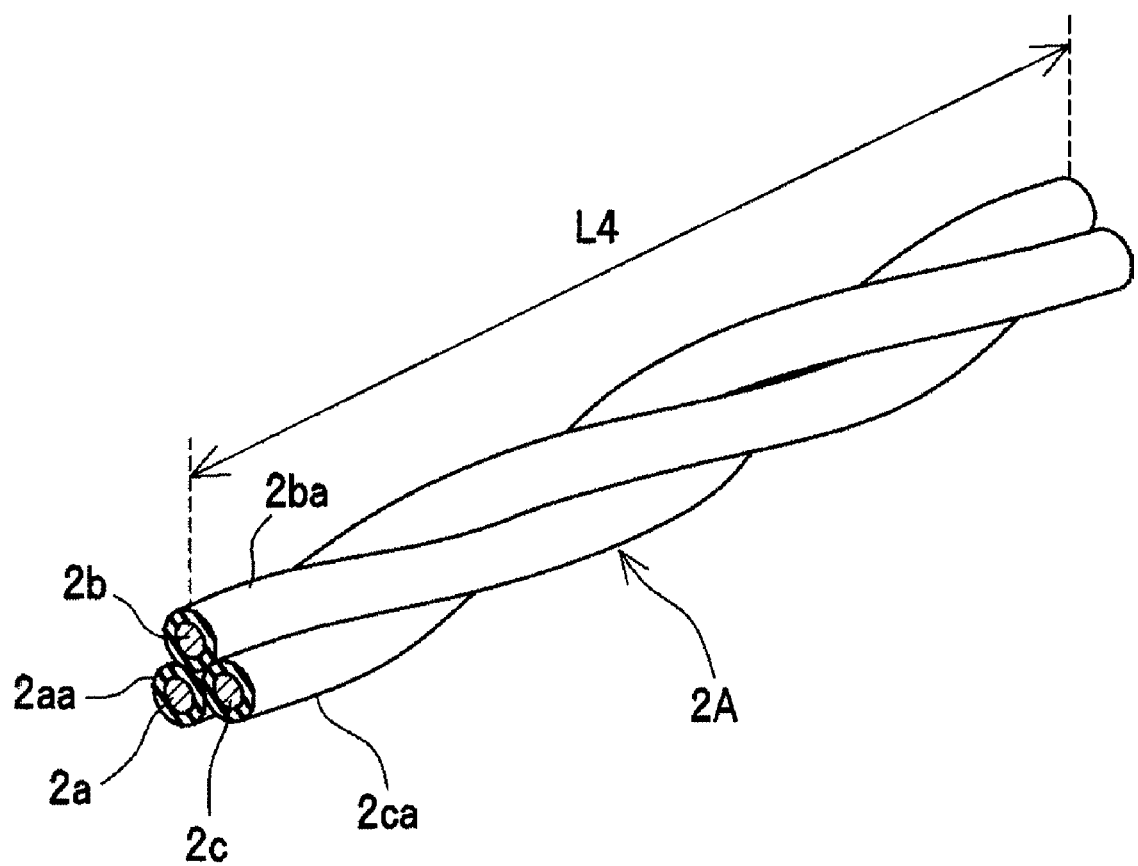
FIG. 4 is a perspective view showing a partial section of the configuration of a differential transmission cable 2A according to a modified example of the first embodiment of the invention.

FIG. 4 is a perspective view showing a partial section of the structure of a differential transmission cable 2A according to a modified example of the first embodiment of the invention. The differential transmission cable 2A of FIG. 4 is the differential transmission cable 2 shown in FIGS. 2 and 3, twisted such that it completes a revolution at a cycle (pitch) of a length L4 in its longitudinal direction. Of the signal lines 2a, 2b, and 2c making up the differential transmission cable 2A, the positions of the pair of signal lines 2a and 2b switches every half segment of one pitch, and the electromagnetic field cancels itself out around this inversion. The electromagnetic field similarly cancels itself out for the signal line pairs 2b and 2c, and 2c and 2a. Like the differential transmission cable 2 shown in FIGS. 2 and 3, the signal lines 2a, 2b, and 2c are disposed such that when viewed in horizontal cross section the distance between any pair of signal lines 2a, 2b, and 2c is equal to a predetermined value, and thus the differential transmission cable 2A made from the signal lines 2a, 2b, and 2c has a 120-degree rotational symmetry in its horizontal cross section. Giving the differential transmission cable 2A of the modified example this shape allows it to achieve not only the effect of the differential transmission cable 2 shown in FIGS. 2 and 3, but also the three signal lines 2a, 2b, and 2c can be easily kept at the same length while twisting, and thus the electromagnetic field that occurs with the signal current is inverted and cancels itself out every half length of the pitch, and therefore it is possible to achieve a multiple differential transmission cable with little unwanted radiation noise.

Second Embodiment

Figure 5:
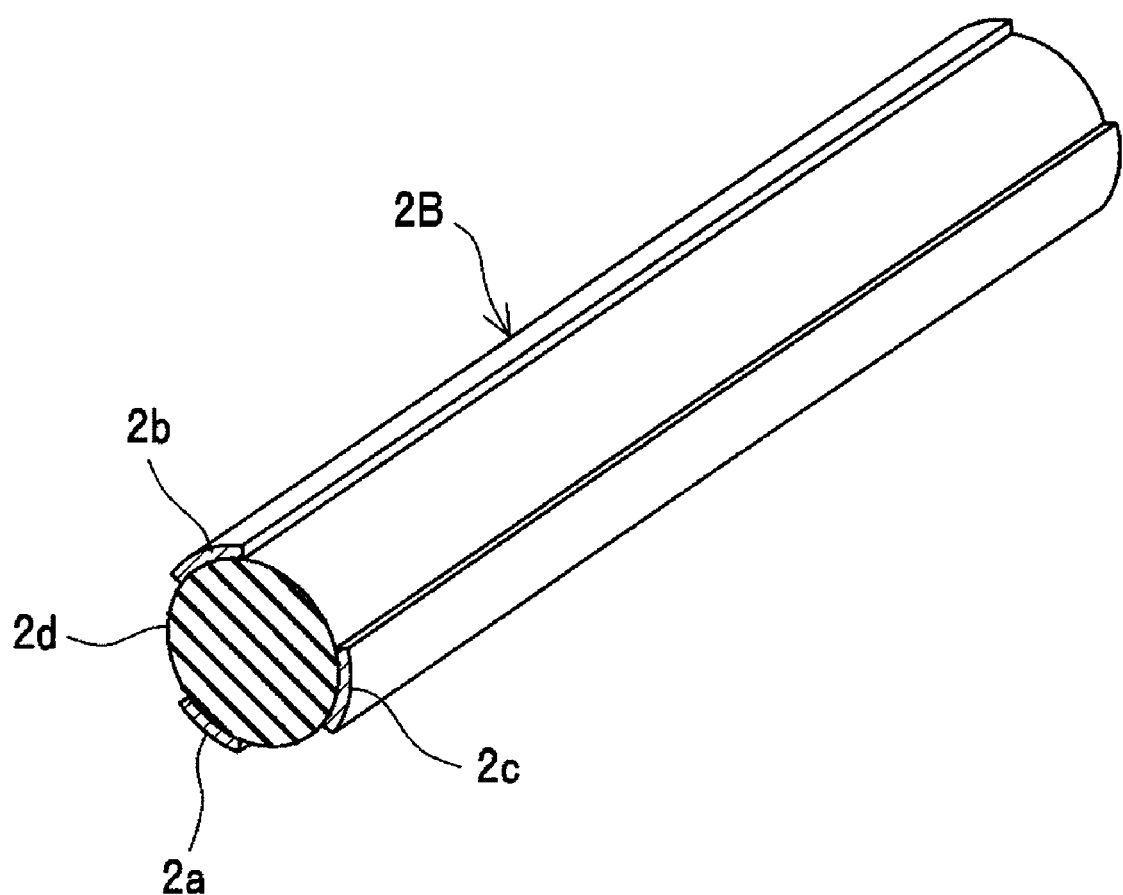
FIG. 5 is a perspective view showing a partial section of the configuration of a differential transmission cable 2B according to a second embodiment of the invention.
Figure 6:
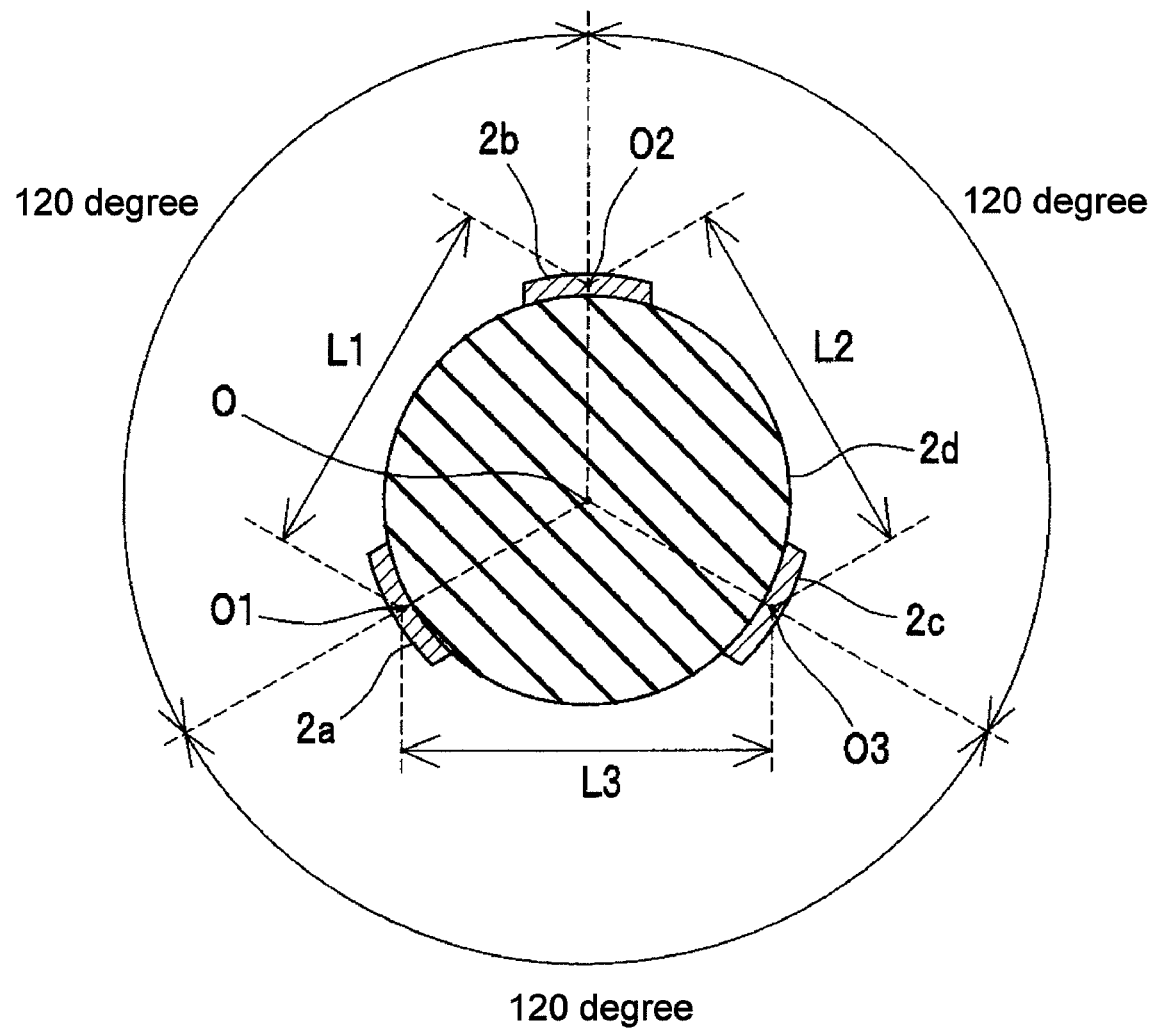
FIG. 6 is a horizontal cross section of the differential transmission cable 2B of FIG. 5.

FIG. 5 is a perspective view showing a partial section of the structure of a differential transmission cable 2B according to a second embodiment of the invention, and FIG. 6 is a horizontal cross section of the differential transmission cable 2B of FIG. 5. Looking at FIGS. 5 and 6, we see that signal lines 2a, 2b, and 2c, which are made of conductors with a predetermined width, are formed on the surface of a dielectric core line 2d, which is formed by a dielectric such as glass epoxy, in the longitudinal direction of the dielectric core line 2d. Like in the case of the first embodiment, the signal lines 2a, 2b, and 2c are disposed such that, when looking at them in horizontal section, the distance L1 between the centers O1 and O2 of the signal lines 2a and 2b, the distance L2 between the centers O2 and O3 of the signal lines 2b and 2c, and the distance L3 between the centers O3 and O1 of the signal lines 2c and 2a, are equal to one another. Thus, the distance between any pair of signal lines 2a, 2b, and 2c is equal to a predetermined value, and moreover, as shown in FIG. 6, the differential transmission cable 2B, which is made from the signal lines 2a, 2b, and 2c, has 120-degree rotational symmetry in its horizontal cross section. The signal lines 2a, 2b, and 2c can be formed as conductor patterns by etching a conductor layer (such as copper foil) that has been formed over the entire surface of the dielectric core layer 2d. Instead of this, the signal lines 2a, 2b, and 2c may also be formed by printing a conductor patter on the dielectric core layer 2d, or adhering the signal lines 2a, 2b, and 2c, which are conductor lines, to the dielectric core layer 2d.

FIGS. 5 and 6 show the dielectric core layer 2d as having a circular horizontal cross-sectional shape, but it may also have another, such as a polygonal, horizontal cross-sectional shape. The dielectric core layer 2d can be made from a dielectric distorted material that is bendable instead of glass epoxy. It should be noted that preferably an insulating cover made of rubber or vinyl can be formed around the differential transmission cable 2B, but for the sake of simplifying the drawings it has not been shown.

Like the differential transmission cables 2 and 2A according to the first embodiment, the differential transmission cable 2B according to this embodiment has the effect that the three signal lines 2a, 2b, and 2c can be easily kept at an even spacing, and thus the differential impedance can be kept constant and the electromagnetic field that occurs with the signal current can cancel itself out, and therefore it is possible to achieve a multiple differential transmission cable with little unwanted radiation noise.

Modified Example of the Second Embodiment

Figure 7:
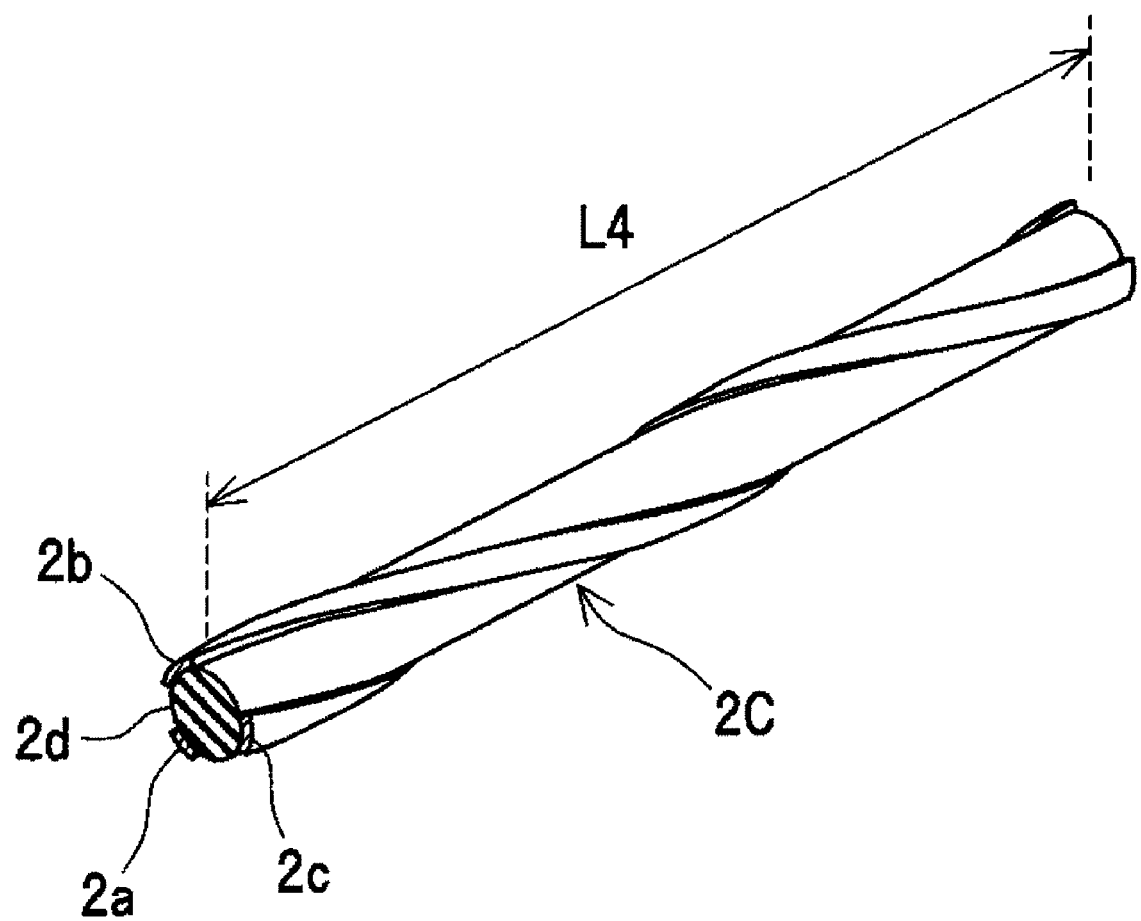
FIG. 7 is a perspective view showing a partial section of the configuration of a differential transmission cable 2C according to a modified example of the second embodiment of the invention.

FIG. 7 is a perspective view showing a partial section of the structure of a differential transmission cable 2C according to a modified example of the second embodiment of the invention. In the case of the differential transmission cable 2A that was described with reference to FIG. 4, the signal lines 2a, 2b, and 2c, which are conductor lines with cladding, are twisted, and thus there is the problem that discrepancies in the pitch length may occur. The present modified example solves this problem.

Looking at FIG. 7 we see that the signal lines 2a, 2b, and 2c are formed on the surface of a dielectric core line 2d in a helical shape in the longitudinal direction of the dielectric core line 2d in such a manner that the distance between any pair of signal lines 2a, 2b, and 2c is equal to a predetermined value. Thus, the differential transmission cable 2C of FIG. 7 has a structure in which the signal lines 2a, 2b, and 2c of the differential transmission cable 2B shown in FIG. 5 and FIG. 6 are twisted such that it completes a revolution at a cycle (or pitch) of a length L4 on the surface of the dielectric core line 2d, and thus, like the differential transmission cable 2A of FIG. 4, it is possible to achieve a canceling out of the electromagnetic field that occurs due to the signal current. Further, like the differential transmission cable 2B shown in FIGS. 5 and 6, the signal lines 2a, 2b, and 2c are disposed such that when viewed in horizontal cross section the distance between any pair of signal lines 2a, 2b, and 2c is equal to a predetermined value, and thus the differential transmission cable 2C made from the signal lines 2a, 2b, and 2c has 120-degree rotational symmetry in its horizontal cross section.

Like in the case of the differential transmission cable 2B of FIGS. 5 and 6, the signal lines 2a, 2b, and 2c can be formed as a conductor pattern, or alternatively, the signal lines 2a, 2b, and 2c, which are conductor lines, can be adhered to the dielectric core line 2d. For example, if the conductor pattern signal lines 2a, 2b, and 2c are to be formed printed on the dielectric core line 2d, then the signal lines 2a, 2b, and 2c can be printed while rotating the dielectric core line 2d, or the signal lines 2a, 2b, and 2c can be printed onto a dielectric core line 2d that has been fixed while rotating the printer head for conductor patterns.

Giving the differential transmission cable 2C of this modified example the aforementioned shape allows it to achieve not only the effects of the differential transmission cable 2B of FIGS. 5 and 6, but also the three signal lines 2a, 2b, and 2c can be easily kept at an even spacing and also twisted, and thus the electromagnetic field that occurs due to the signal current is inverted and cancels itself out every half length of the pitch, and the signal lines 2a, 2b, and 2c are formed as conductor patterns, and thus discrepancies in the pitch do not occur. Therefore, with the differential transmission cable 2C of this modified example, it is possible to achieve a multiple differential transmission cable that has little unwanted radiation noise.

Modified Examples

The embodiment that was described with reference to FIG. 1 describes the odd mode impedance of the differential transmission cable 2 as set at 50Ω and its differential impedance set at 100Ω, but it is also possible to set the impedances to other values. The above embodiment describes an example in which three differential driver circuits 1a, 1b, and 1c are formed in the differential driver IC1, and three terminal resistors Ra, Rc, and Rc and three differential receiver circuits 3a, 3b, and 3c are formed in the differential receiver IC3, but the effects are the same when a plurality of ICs each of which has a single circuit formed are mounted onto a printer circuit board. The above embodiment describes an example in which terminal resistors Ra, Rb, and Rc are formed in the differential receiver IC3, but the same effects are had when the terminal resistors Ra, Rb, and Rc are mounted onto the printed circuit board as external components.

The above embodiments describe LVDS as an example, but the same effects are obtained with other differential transmission methods as well. Further, the above embodiments describe the case of a multiple differential transmission method, but the same effects are obtained with other differential transmission methods or other signal transmission methods in which three signal lines are used.

By shielding the differential transmission cables 2, 2A, 2B, and 2C according to the first or second embodiments with a conducting material, it is possible to further reduce unwanted radiation noise.

ATTACHMENTS

The present invention can also be represented as follows.
(Attachment 1)
A transmission cable that is provided with three signal lines and that performs multiple transmission of a group of three differential signals;
wherein in a cross section perpendicular to the longitudinal direction of the transmission cable, the distance between any pair of signal lines of the three signal lines is equal to a predetermined value.
(Attachment 2)
The transmission cable according to attachment 1,
wherein the transmission cable is twisted in its longitudinal direction.
(Attachment 3)
The transmission cable according to attachment 1,
further comprising a core line that is made from a dielectric material;
wherein the three signal lines are formed on the surface of the core line.
(Attachment 4)
A transmission cable comprising:
a core line that is made from a dielectric material; and
three signal lines that are formed on the surface of the core line;
wherein in a cross section perpendicular to the longitudinal direction of the transmission cable, the distance between any pair of signal lines of the three signal lines is equal to a predetermined value.

(Attachment 5)

The transmission cable according to attachment 3 or 4, wherein the three signal lines are formed as conductor patterns that have been printed on the surface of the core line.

(Attachment 6)

The transmission cable according to attachment 3 or 4, wherein the three signal lines are formed by etching a conductor layer that has been formed on the surface of the core line.

(Attachment 7)

The transmission cable according to any one of attachments 3 through 6, wherein the three signal lines are formed in a helix in the longitudinal direction of the core line.

(Attachment 8)

The transmission cable according to any one of attachments 1 through 7, wherein in a cross section perpendicular to the longitudinal direction of the transmission cable, the three signal lines have 120-degree rotational symmetry about the center of the transmission cable.

(Attachment 9)

The transmission cable according to any one of attachments 1 through 7, wherein in a cross section perpendicular to the longitudinal direction of the transmission cable, the transmission cable has 120-degree rotational symmetry about its center.

With the transmission cable of the invention, it is possible to keep a fixed distance between signal lines and a horizontal cross-sectional shape over the entire length of the transmission cable, which has three signal lines, in its longitudinal direction, and moreover it is possible to maintain a configuration in which the three signal lines are twisted, and thus the invention is useful as a multiple differential transmission cable that has little unwanted radiation noise.

What is claimed is:

1. A transmission cable that is used in a multiple differential transmission system and that performs multiple transmission of a group of three differential signals, the transmission system comprising:

a signal transmitter and a signal receiver;

wherein the signal transmitter is connected to a differential transmission path that has first, second, and third signal lines, and comprises:

a first differential driver that transmits a first output signal, and an inverted first output signal that is a phase inverted signal of the first output signal, in response to a first bit information signal;

a second differential driver that transmits a second output signal, and an inverted second output signal that is a phase inverted signal of the second output signal, in response to a second bit information signal; and a third differential driver that transmits a third output signal, and an inverted third output signal that is a phase inverted signal of the third output signal, in response to a third bit information signal;

wherein the signal transmitter synthesizes the first output signal and the inverted third output signal and transmits the result to the first signal line, synthesizes the second output signal and the inverted first output signal and transmits the result to the second signal line, and synthesizes the third output signal and the inverted second output signal and transmits the result to the third signal line; and wherein the absolute value of the binary signal voltage of the first output signal and the absolute value of the binary signal voltage of the second output signal are identical, and the absolute value of the binary signal voltage of the third output signal and absolute value of the binary signal voltage of the first output signal are different;

wherein the signal receiver is connected to the differential transmission path, which has the first, second, and third signal lines, and comprises:

a first differential receiver that detects a polarity of a terminal voltage that is generated in a first terminal resistor that is connected between the first signal line and the second signal line, and outputs the result of that detection as a first bit information signal;

a second differential receiver that detects a polarity of a terminal voltage that is generated in a second terminal resistor that is connected between the second signal line and the third signal line, and outputs the result of that detection as a second bit information signal;

a third differential receiver that detects a polarity of a terminal voltage that is generated in a third terminal resistor that is connected between the third signal line and the first signal line, and outputs the result of that detection as a third bit information signal;

a comparison unit of determining whether or not the absolute value of the third terminal voltage that is generated in the third terminal resistor exceeds a predetermined threshold voltage; and a control unit of outputting the first, second, and third bit information signals that are output from the first, second, and third differential receivers, when the absolute value of the third terminal voltage exceeds the predetermined threshold voltage, and outputs a 0 or 1 for all of the first, second, and third bit information signals, depending on the third bit information signal that is output from the third differential receiver, when the absolute value of the third terminal voltage does not exceed the predetermined threshold voltage;

wherein the threshold voltage is set so that it is larger than the absolute value of the difference between the absolute value of the binary signal voltage of the first output signal and the absolute value of the binary signal voltage of the third output signal;

wherein said transmission cable comprises:

three signal lines; and wherein in a cross section perpendicular to a longitudinal direction of the transmission cable, a distance between any pair of signal lines of the three signal lines is equal to a predetermined value.

2. The transmission cable according to claim 1, wherein the three signal lines are twisted about one another in the longitudinal direction of the three signal lines.

3. The transmission cable according to claim 1, wherein the three signal lines have 120-degree rotational symmetry about the center of the transmission cable, in a cross section perpendicular to the longitudinal direction of the transmission cable.

4. The transmission cable according to claim 1, wherein the transmission cable has 120-degree rotational symmetry about the center of the transmission cable, in a cross section perpendicular to the longitudinal direction of the transmission cable.

5. A transmission cable comprising:

a core line made from a dielectric material; and three signal lines that are formed on a surface of the core line;

wherein in a cross section perpendicular to a longitudinal direction of the transmission cable, a distance between any pair of signal lines of the three signal lines is equal to a predetermined value;

wherein the transmission cable is used in a multiple differential transmission system and performs multiple transmission of a group of three differential signals, and the transmission system comprises:

a signal transmitter and a signal receiver;

wherein the signal transmitter is connected to a differential transmission path that has first, second, and third signal lines, and comprises:

a first differential driver that transmits a first output signal, and an inverted first output signal that is a phase inverted signal of the first output signal, in response to a first bit information signal;

a second differential driver that transmits a second output signal, and an inverted second output signal that is a phase inverted signal of the second output signal, in response to a second bit information signal; and a third differential driver that transmits a third output signal, and an inverted third output signal that is a phase inverted signal of the third output signal, in response to a third bit information signal;

wherein the signal transmitter synthesizes the first output signal and the inverted third output signal and transmits the result to the first signal line, synthesizes the second output signal and the inverted first output signal and transmits the result to the second signal line, and synthesizes the third output signal and the inverted second output signal and transmits the result to the third signal line; and wherein the absolute value of the binary signal voltage of the first output signal and the absolute value of the binary signal voltage of the second output signal are identical, and the absolute value of the binary signal voltage of the third output signal and absolute value of the binary signal voltage of the first output signal are different;

wherein the signal receiver is connected to the differential transmission path, which has the first, second, and third signal lines and comprises:

a first differential receiver that detects a polarity of a terminal voltage that is generated in a first terminal resistor that is connected between the first signal line and the second signal line, and outputs the result of that detection as a first bit information signal;

a second differential receiver that detects a polarity of a terminal voltage that is generated in a second terminal resistor that is connected between the second signal line and the third signal line, and outputs the result of that detection as a second bit information signal;

a third differential receiver that detects a polarity of a terminal voltage that is generated in a third terminal resistor that is connected between the third signal line and the first signal line, and outputs the result of that detection as a third bit information signal;

a comparison unit for determining whether or not the absolute value of the third terminal voltage that is generated in the third terminal resistor exceeds a predetermined threshold voltage; and a control unit for outputting the first, second, and third bit information signals that are output from the first, second, and third differential receivers, when the absolute value of the third terminal voltage exceeds the predetermined threshold voltage, and outputs a 0 or 1 for all of the first, second, and third bit information signals, depending on the third bit information signal that is output from the third differential receiver, when the absolute value of the third terminal voltage does not exceed the predetermined threshold voltage;

wherein the threshold voltage is set so that it is larger than the absolute value of the difference between the absolute value of the binary signal voltage of the first output signal and the absolute value of the binary signal voltage of the third output signal.

6. The transmission cable according to claim 5, wherein the three signal lines are formed as a conductor pattern that is printed on a surface of the core line.

7. The transmission cable according to claim 5, wherein the three signal lines are formed by etching a conductor layer that is formed on a surface of the core line.

8. The transmission cable according to claim 5, wherein the three signal lines are formed in a helical shape in the longitudinal direction of the core line.

* * * * *